April 6, 1948.  R. E. KITTREDGE  2,439,169
TRAINING DEVICE
Filed Feb. 17, 1945  14 Sheets-Sheet 1

RAYMOND E. KITTREDGE
*INVENTOR.*

BY
ATTORNEYS

April 6, 1948.  R. E. KITTREDGE  2,439,169
TRAINING DEVICE
Filed Feb. 17, 1945  14 Sheets-Sheet 2
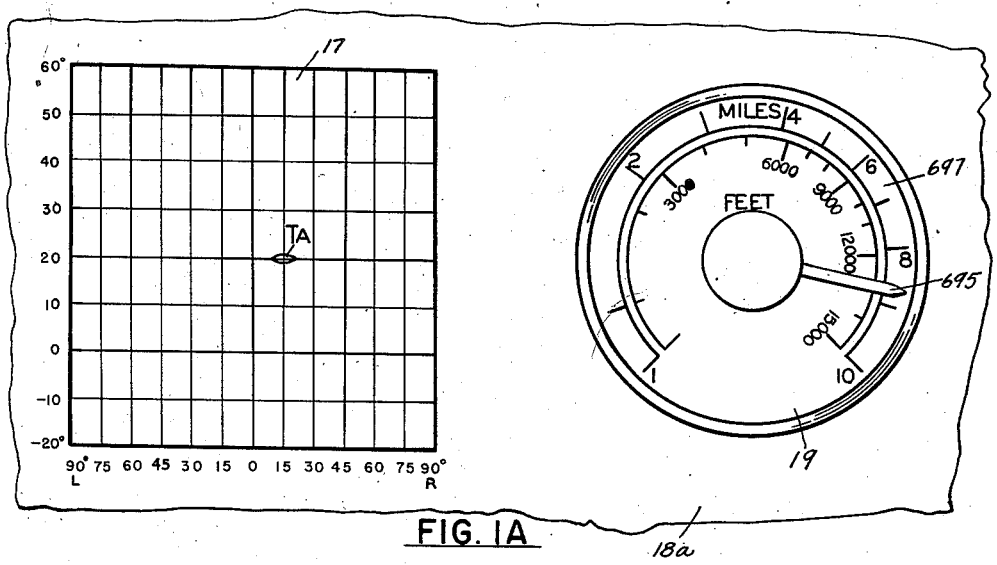
FIG. 1A
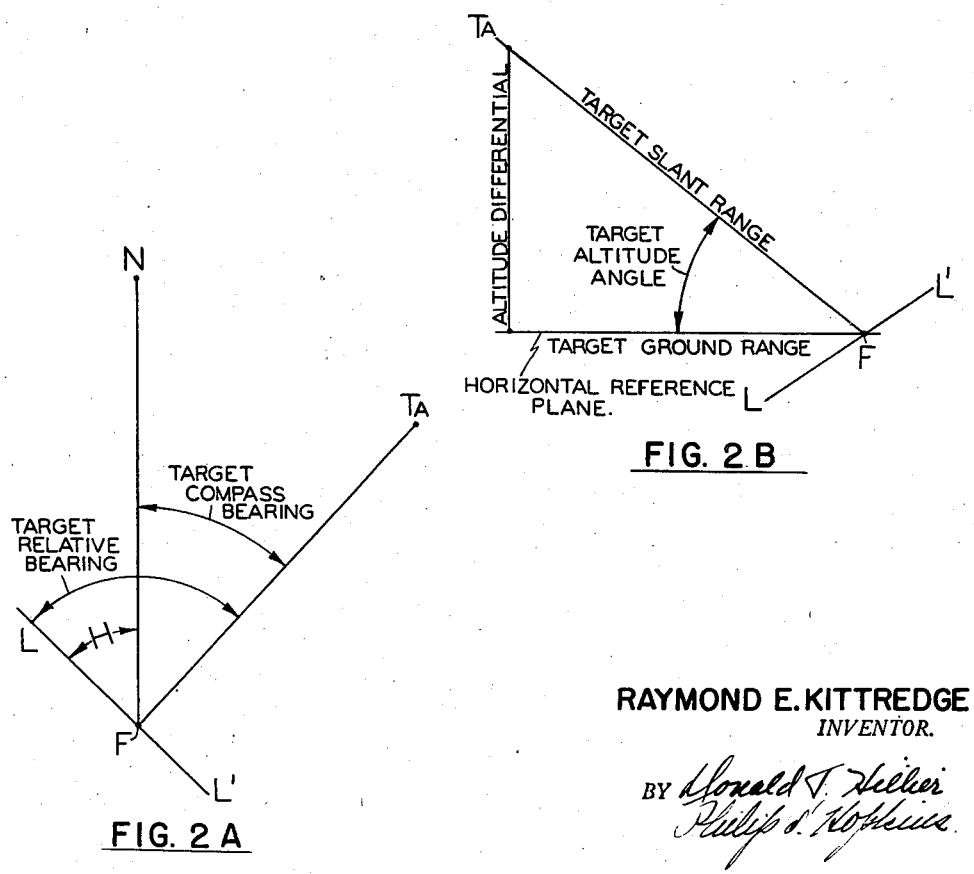
FIG. 2B
FIG. 2A
RAYMOND E. KITTREDGE
*INVENTOR.*
BY
ATTORNEYS

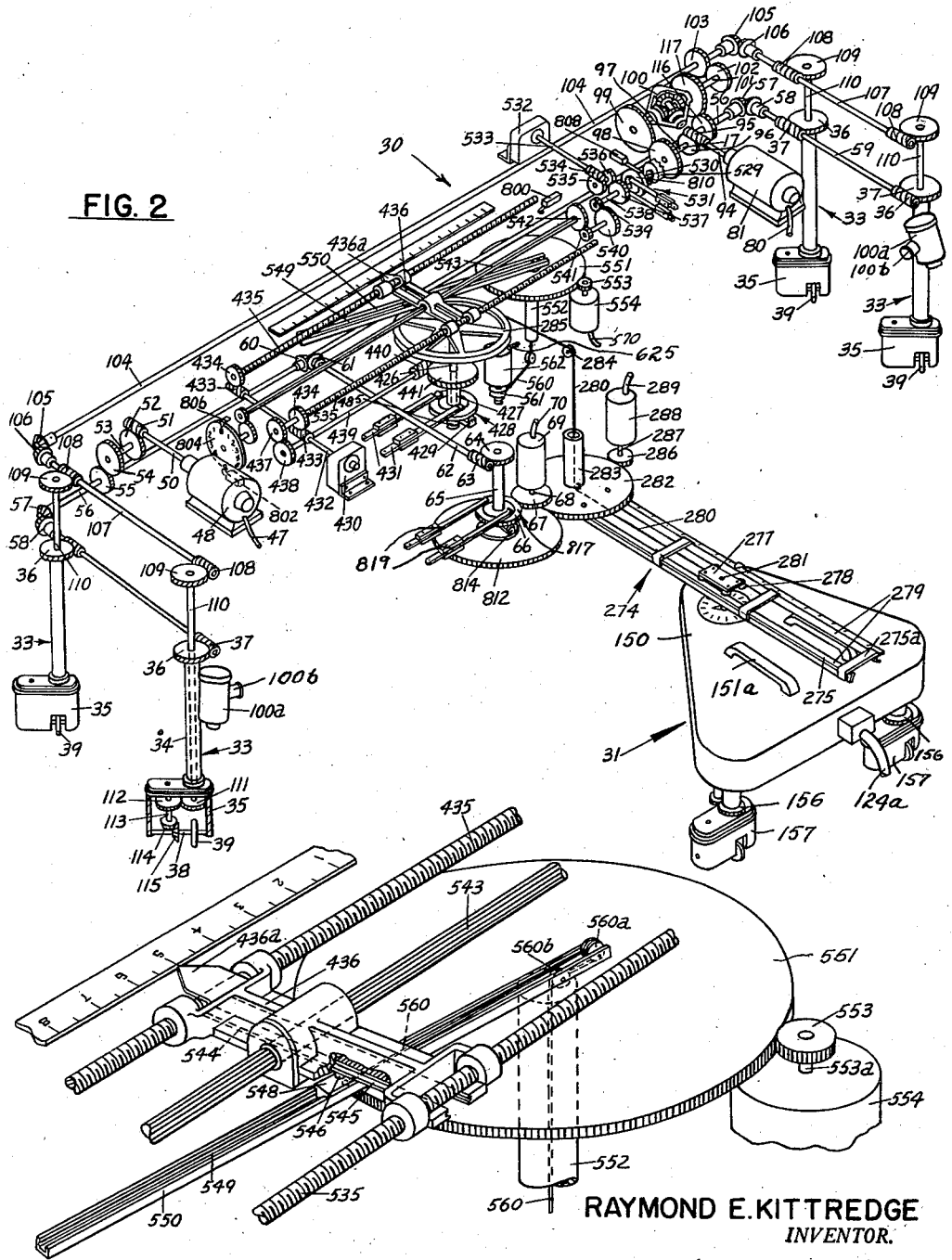

RAYMOND E. KITTREDGE
INVENTOR.

April 6, 1948.  R. E. KITTREDGE  2,439,169
TRAINING DEVICE
Filed Feb. 17, 1945  14 Sheets-Sheet 6
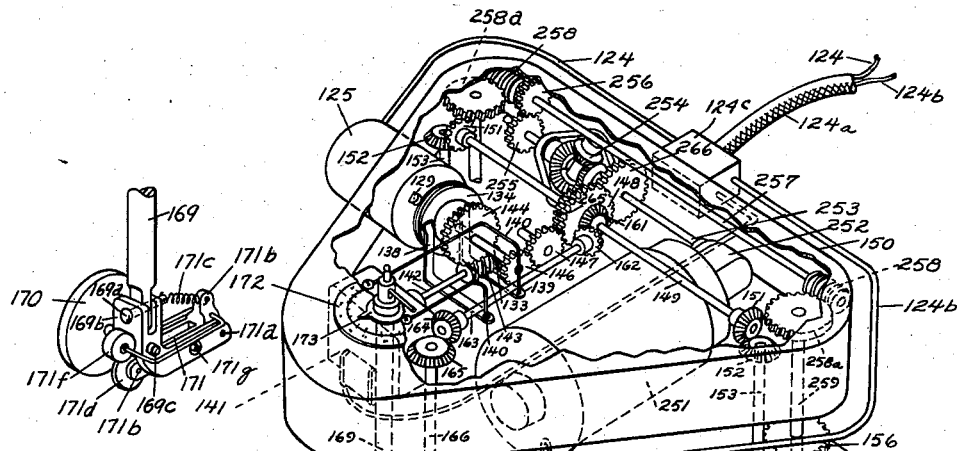
FIG. 5C  FIG. 5
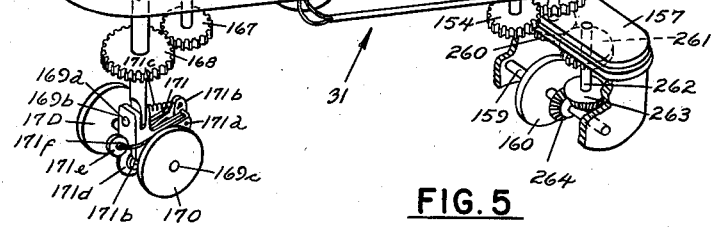
FIG. 5A
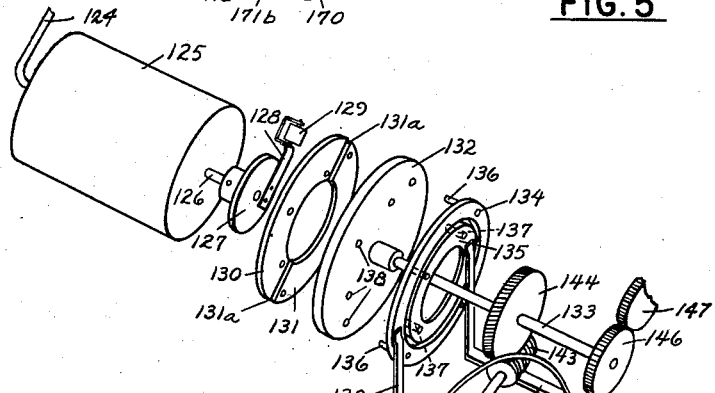
FIG. 5B
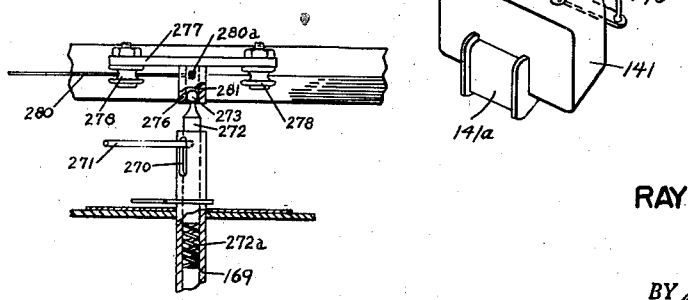
RAYMOND E. KITTREDGE
*INVENTOR.*
BY *Donald T. Hebber*
*Philip L. Hopkins*
ATTORNEYS April 6, 1948.                    R. E. KITTREDGE                    2,439,169
                                   TRAINING DEVICE
                        Filed Feb. 17, 1945        14 Sheets-Sheet 7

RAYMOND E. KITTREDGE
            INVENTOR.

BY
                ATTORNEYS

April 6, 1948.    R. E. KITTREDGE    2,439,169
TRAINING DEVICE
Filed Feb. 17, 1945    14 Sheets-Sheet 8

RAYMOND E. KITTREDGE
INVENTOR.

BY

ATTORNEYS

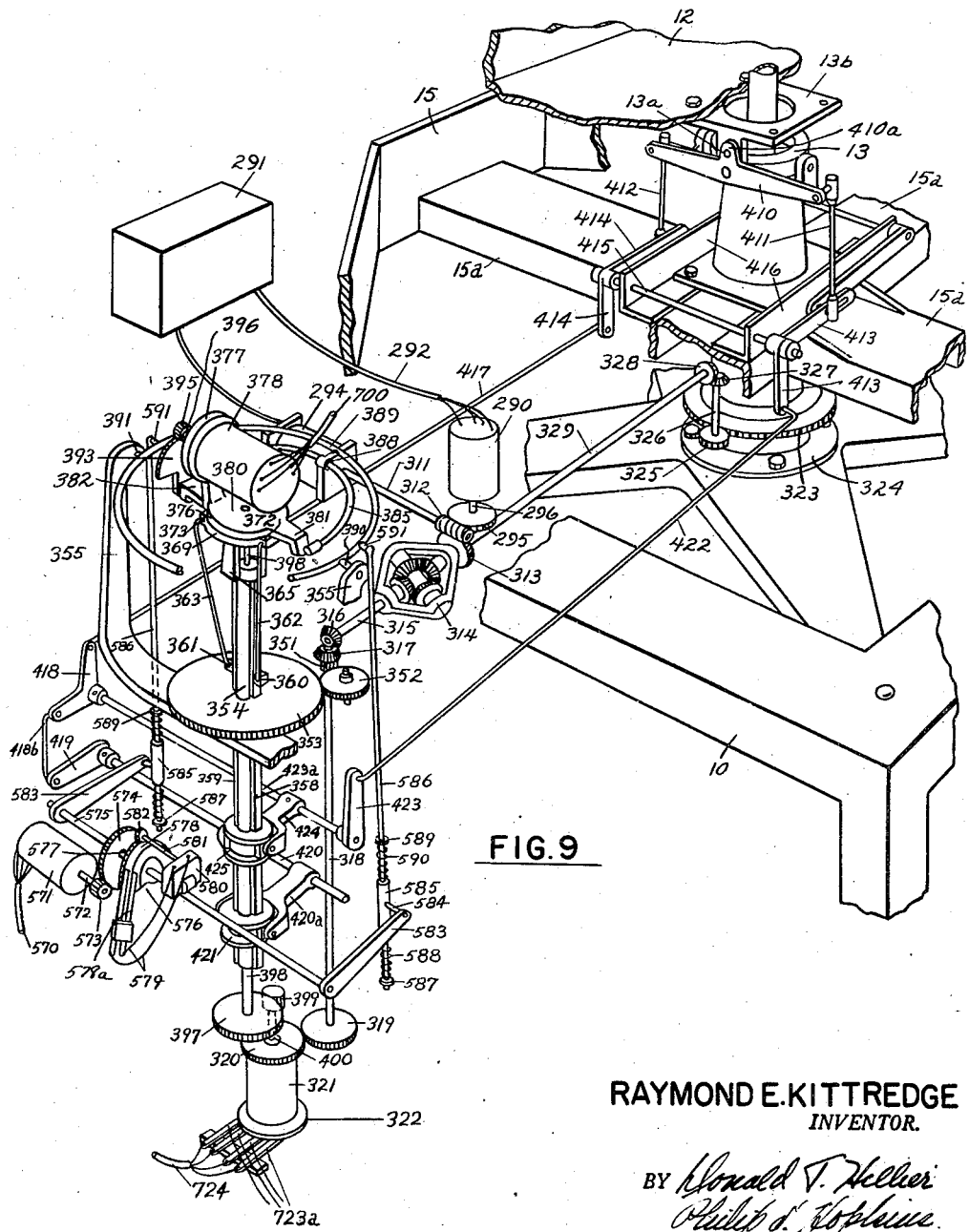

April 6, 1948. R. E. KITTREDGE 2,439,169
TRAINING DEVICE
Filed Feb. 17, 1945 14 Sheets-Sheet 10

RAYMOND E. KITTREDGE
*INVENTOR.*

BY *Donald T. Hellier*
*Philip A. Hopkins*
ATTORNEYS

April 6, 1948.  R. E. KITTREDGE  2,439,169
TRAINING DEVICE
Filed Feb. 17, 1945  14 Sheets-Sheet 11
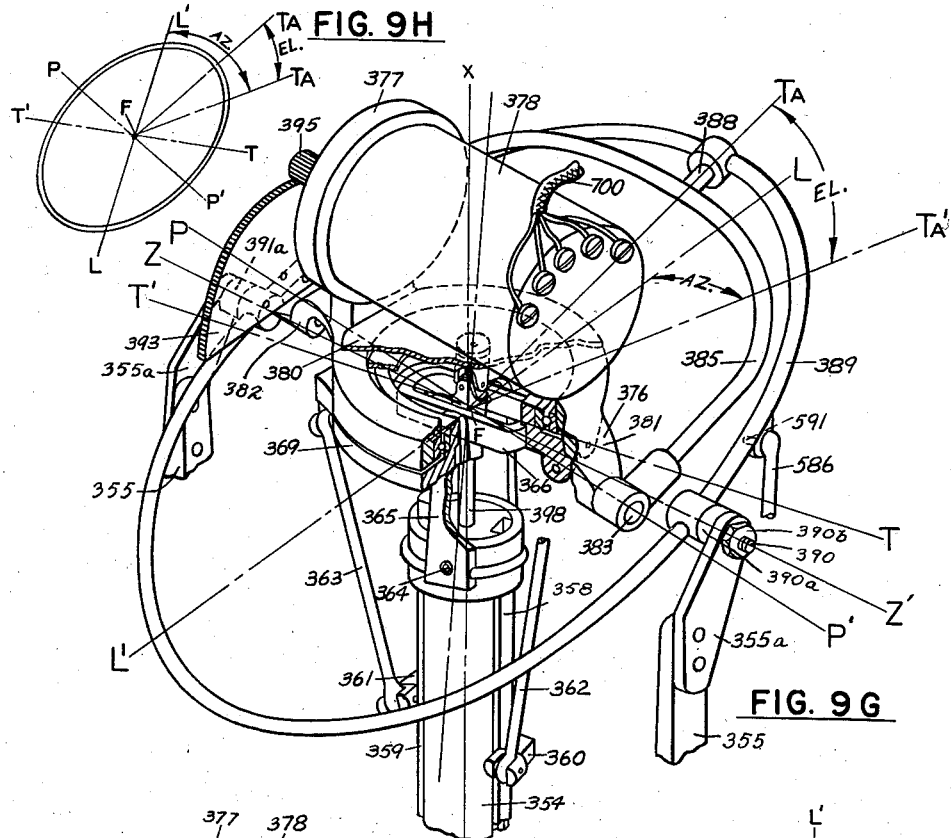
FIG. 9H
FIG. 9G
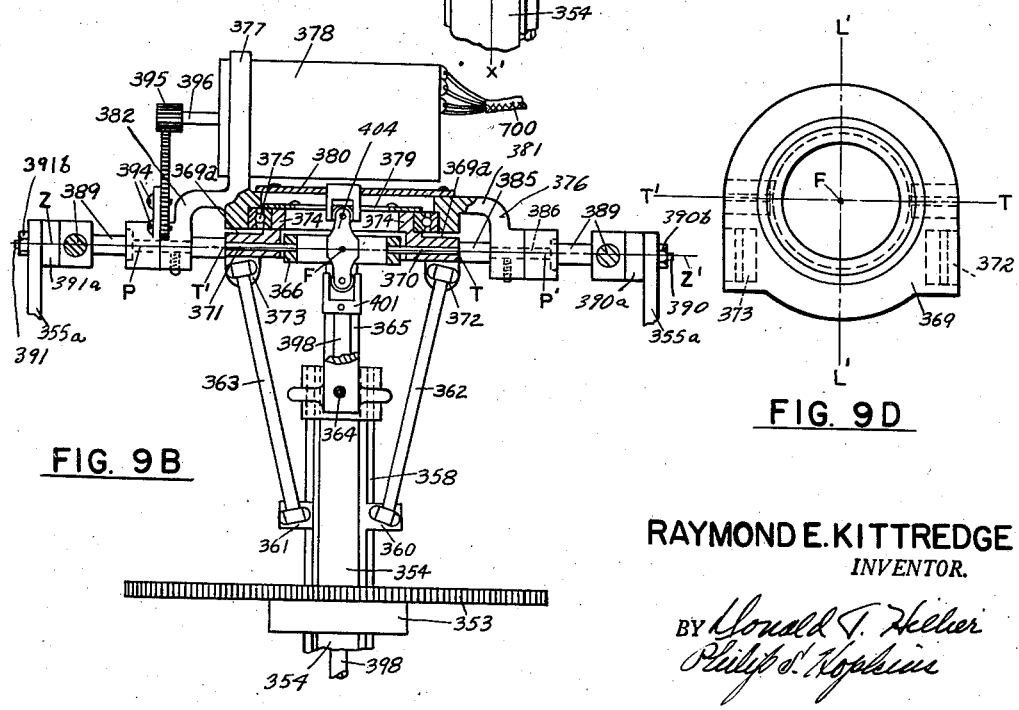
FIG. 9B
FIG. 9D
RAYMOND E. KITTREDGE
*INVENTOR.*
BY Donald T. Heller
Philip S. Hopkins
ATTORNEYS April 6, 1948.   R. E. KITTREDGE   2,439,169
TRAINING DEVICE
Filed Feb. 17, 1945    14 Sheets-Sheet 12

RAYMOND E. KITTREDGE
INVENTOR.

BY
ATTORNEYS

RAYMOND E. KITTREDGE
*INVENTOR.*

BY

ATTORNEYS

April 6, 1948.                R. E. KITTREDGE                2,439,169
                                TRAINING DEVICE
               Filed Feb. 17, 1945            14 Sheets-Sheet 14

RAYMOND E. KITTREDGE
*INVENTOR.*

BY

ATTORNEYS

Patented Apr. 6, 1948

2,439,169

UNITED STATES PATENT OFFICE 2,439,169

TRAINING DEVICE

Raymond E. Kittredge, Binghamton, N. Y., assignor to Link Aviation, Inc., a corporation of New York Application February 17, 1945, Serial No. 578,369

35 Claims. (Cl. 35—25)

This invention relates to a device for use in training personnel in the use of radar equipment, and more particularly, in the training of personnel to fly an airplane by means of radar. This application is a continuation-in-part of my co-pending application Serial Number 527,248 filed March 20, 1944 which since the filing of this application has matured into United States Patent 2,396,857, dated March 19, 1946, for Training device.

In order that the general nature of this invention may be better understood, reference is made to Fig. 1A which is a schematic view of one kind of radar screen or C scope 17 and range meter 19 to which the pilot of a combat plane may refer when piloting the plane by means of radar.

Fig. 1A shows that the pilot's screen and range meter are side by side. The pilot's screen is commonly referred to as the C scope and has upon its face a plurality of horizontal as well as a plurality of vertical lines. A scale is associated with each set of lines, and it will be seen that the central vertical line is designated 0, while the lines to either side of this zero line are successively designated by increasing increments of 15 up to 90.

The horizontal lines are likewise designated in increasing increments of 15 beginning with the designation of minus 20 for the lowermost line and continuing up to plus 60.

The range meter is provided with a needle adapted to move over two scales one above the other, the outer scale being graduated in miles from zero to ten and the inner scale being graduated in feet from zero to fifteen thousand. Means are provided whereby the scales are selectively used, depending upon the distance of the target from the radar equipped plane.

One typical use of radar is in a fighter plane which is attempting to intercept a target plane. It is this particular situation which the preferred embodiment of my invention will be described as simulating, although it will be readily apparent that the invention may readily be applied to the simulation of all types of navigation by radar.

In order that the objects of my invention may be more readily understood the geometrical relationships between a fighter plane and a target plane should be borne in mind. Inasmuch as it is assumed that it is the fighter which is equipped with radar, it is the position of the target relative to the fighter which is considered.

Three factors will locate the position of the target relative to the fighter:

1. Target azimuth angle, which is the angle between the fighter's longitudinal axis and the projection of the line of sight from the fighter to the target on the plane through the lateral and longitudinal axes of the fighter. Azimuth is measured from the end of the projection of the longitudinal axis corresponding to the nose of the plane clockwise or counterclockwise through 180°, but the specific type of radar indicating equipment being considered only indicates azimuth up to 90° left or right. If azimuth is greater than 90° the target image is not shown upon the scope.

This definition is illustrated in Fig. 9H where the line L—L' designates the direction of flight and the fighter's longitudinal axis; the line F—Ta is the line of sight from the fighter to the target; F—Ta' designates the projection of the line of sight F—Ta on the plane 369 through the lateral T—T' and longitudinal L—L' axes of the fighter, and the azimuth angle is so labelled.

2. Target elevation angle, which is the angle between the line of sight from the fighter to the target and the plane through the lateral and longitudinal axes of the fighter.

This definition is illustrated in Fig. 9H where 369 illustrates the plane of the lateral T—T' and longitudinal L—L' axes of the fighter, F—Ta is the line of sight from the fighter to the target and the target elevation angle is so designated.

3. Target slant range, which is the distance along the line of sight from the fighter to the target is illustrated in Fig. 2B.

It is these three factors which are given by the C scope and range meter carried by a real fighter plane equipped with radar. In real radar carried by a fighter plane, the plane is equipped with means which cause the image on the scope to be positioned according to the azimuth and elevation angle of the target. Also, the radar equipment causes the range meter to register in accordance with the distance of the target from the fighter. The radar indicating means therefore indicate the azimuth, elevation angle and range of the target. The radar equipment carried by the fighter, in and of itself, forms no part of this invention, and therefore is not herein shown in detail. However, sufficient description of the parts of the radar equipment used with my invention will be given hereinafter to enable those skilled in the field of radar to practice this invention.

When the radar equipment carried by a plane is set in operation, if a target plane be within the field of operation of the equipment, an image such as that shown at Ta in Fig. 1A appears upon the screen.

The azimuth of the target as previously defined is conveyed to the pilot of the radar equipped plane by the position of the image on the screen relative to the vertical line marked zero. If the image appeared as shown in Fig. 1A the azimuth of the target would be 15 degrees right. The target elevation angle is indicated to the pilot by the position of the image relative to the scale at the right of the screen, and in the illustrated case is plus 20 degrees. At the same time the range meter shows the slant range of the target from the fighter—in the illustrated case the slant range being 8½ miles. If the radar equipment continues in operation, and the target remains within the field of operation thereof, the position of the target relative to the fighter is continuously given by the scope and range meter. The position of the target relative to the axes of the fighter as shown by the scope and meter changes in response to the following movements of the target:

1. Changes in the latitude of the target;
2. Changes in the longitude of the target;
3. Changes in the altitude of the target.

Furthermore, the position of the target relative to the axes of the fighter as shown by the radar indicating means changes in response to the following movements of the fighter:

4. Changes in the latitude of the fighter;
5. Changes in the longitude of the fighter;
6. Changes in the altitude of the fighter;
7. Changes in the position of the fighter about its vertical axis;
8. Changes in the position of the fighter about its longitudinal axis;
9. Changes in the position of the fighter about its transverse axis.

As far as the first six mentioned factors are concerned it is deemed unnecessary to show in detail how changes in each of these factors affect the position of the target relative to the fighter in terms of the three basic concepts defined above.

It is clear that the relative positions of two points in space in terms of azimuth, angular difference in height and distance may change as either point changes its position in any one of the three possible directions of movement, or combinations thereof. Considering the last three mentioned factors, it is clear that a change in the position of the fighter about its vertical axis, i. e., a turning of the fighter, will produce a change in the azimuth of the target. As far as factor 8 is concerned, let us assume that the target is 90° from the nose of the fighter, i. e., directly abeam, and that the fighter changes its position about its longitudinal axis—that is, it banks. It is clear that the target elevation angle will be changed by an amount equal to the bank. And as far as the last mentioned factor is concerned, in the event the target is directly ahead of the fighter, i. e., its azimuth is zero, a change in the fighter's position about its lateral axis—i. e., a diving or a climbing thereof, will produce a change in the target elevation angle by an amount equal to the change about the lateral axis. Banking and pitching of a fighter plane variously affect target azimuth angle and target elevation angle, as is well understood by those skilled in the art.

My above mentioned patent application discloses means for varying the indications of the radar screen and range meter according to assumed changes in the above mentioned factors which in actual flight control the radar indications. However, in that application the azimuth indication was not affected by assumed pitching and banking movements of the simulated radar-equipped fighter plane, which, as will later appear, may form an important part of my invention. Also, the elevation angle indications were only approximately correct under circumstances of assumed pitching and banking of the simulated radar equipped fighter plane.

It is the basic object of my invention to provide means which will at all times change the azimuth and elevation angle indications properly in response to an assumed pitching and banking of the radar-equipped fighter plane.

Other objects of my invention will become apparent as the description proceeds.

My invention may include an aviation trainer which comprises a fuselage universally and rotatably mounted upon a stationary base. This trainer represents the fighter plane. The fuselage may bank, climb, dive and turn indefinitely in either direction. The student in the fuselage, by means of the rudder pedals in the fuselage which actuate a turning motor, may cause the fuselage to turn in either direction. By means of the control column or stick which is also in the fuselage the student may cause the fuselage to bank, climb and pitch by means of the banking, pitching and climbing bellows which are actuated by the movements of the control column. All of these movements of the fuselage in and of themselves form no part of the present invention, and for a complete disclosure thereof reference is made to United States Patents 1,825,462 and 2,099,857.

However, the instant invention discloses in the interior of the fuselage at a place visible to the student the previously described radar indicating means, viz., the C scope and range meter. Other types of radar indicating means may be readily adopted for use with my invention. Hereinafter in the description when a radar equipped plane is referred to, a plane equipped with the illustrated type of radar indicating means is intended.

Upon a table remote from the trainer fuselage is a recorder which represents the target, and this recorder may under the control of an operator be made to move in any direction and at varying rates across a chart on the table. Therefore the direction and speed of horizontal movements of the target are simulated by the direction and speed of the target recorder's movements.

Also mounted upon the same chart and table is a recorder which represents the fighter. This recorder is of the type described in United States Patent 2,179,663. Its movement over the chart is automatically directionally responsive to changes in the heading of the trainer and its speed of movement varies according to the assumed horizontal speed of the trainer. The direction and speed of horizontal movements of the fighter are therefore simulated by the direction and speed of this second recorder's movements. Thus, the position of the target recorder on the chart at all times represents the assumed latitude and longitude of the target, while the position of the fighter recorder on the chart at all times represents the assumed latitude and longitude of the fighter.

These two recorders are mechanically coupled and connected to the radar indicating means so that a movement of either one relative to the other, through an intermediate system of electrical and mechanical elements, produces the same changes in the position of the image on the radar scope and in the range meter's reading that corresponding real changes in the latitude and longitude of a real target and of a real fighter would produce on the radar scope and meter in the fighter.

A manual control whereby the operator may set into the mechanism the assumed altitude of the target is provided, and the assumed altitude of the fighter is automatically changed and introduced into the apparatus as will be later pointed out. As the assumed altitude of the fighter or of the target is changed, through electrical and mechanical means, the radar indicating means are changed just as are the real radar indicating means carried by a real fighter when corresponding real changes in target or fighter altitude occur.

Further, means are provided to change the radar indicating means in response to a turning, banking and pitching of the fuselage of the trainer in simulation of the changes which occur in the radar indicating means carried by a real fighter when the fighter makes corresponding movements. It should be noted that the factors of target azimuth and target elevation angle may change in response to the turning, banking, climbing and diving of the plane equipped with radar, and that the radar indicating means respond to these movements. This is because radar equipment is designed to indicate the position of the target relative to the longitudinal, lateral and vertical axes of the radar equipped plane. Latitude, longitude and altitude of the radar equipped plane also are determining factors, but as far as the target is concerned, the only determining factors are latitude, longitude and altitude. In other words, the target may be considered to be a point having location only.

Fig. 1 shows a grounded aviation trainer of the type disclosed in U. S. Patents 1,825,462 and 2,099,857 together with the fighter and target recorders upon the table, the instructor's control drawer and information panel as well as the radar operator's panel.

Fig. 2 is a detailed showing of the fighter and target recorders.

Figs. 2A and 2B illustrate some of the important terms used herein.

Fig. 2C is a detailed drawing of a part of the mechanical triangulating means of this invention.

Fig. 5 is a detailed showing of the fighter recorder.

Figs. 5A, 5B and 5C are detailed views of parts of the fighter recorder.

Fig. 9 shows the attitude correction unit and Figs. 9A, 9B, 9C, 9D, 9E, 9F and 9G are detailed parts of the attitude correction unit, while Fig. 9H illustrates some of the definitions used herein as well as the principle of the attitude correction unit.

Fig. 13A is a detailed view of a portion of the apparatus of Fig. 13.

The disclosed embodiment of my invention includes in several places the well known system of remote actuation by teletorques and telegons. A general explanation of this system is therefore believed desirable. Each of these systems includes a transmitter and receiver suitably supplied with electrical energy and connected by means of a cable. The transmitter includes a housing and a rotor, the rotor usually being referred to as the input shaft, and the receiver also includes a housing and a rotor, but the rotor of the receiver is referred to as the output shaft. When the input shaft of the transmitter is turned in one direction, the output shaft of the receiver simultaneously moves in a corresponding direction and through the same angle, and when the input shaft moves in the reverse direction the output shaft moves in the reverse direction through the same angle. By selectively coupling the transmitter and receiver, for a movement in one direction of the input shaft the output shaft may be made to move in the desired direction. Teletorques are used when a relatively strong source of power is available to move the input shaft; otherwise telegons are employed.

The fighter

Figure 1:
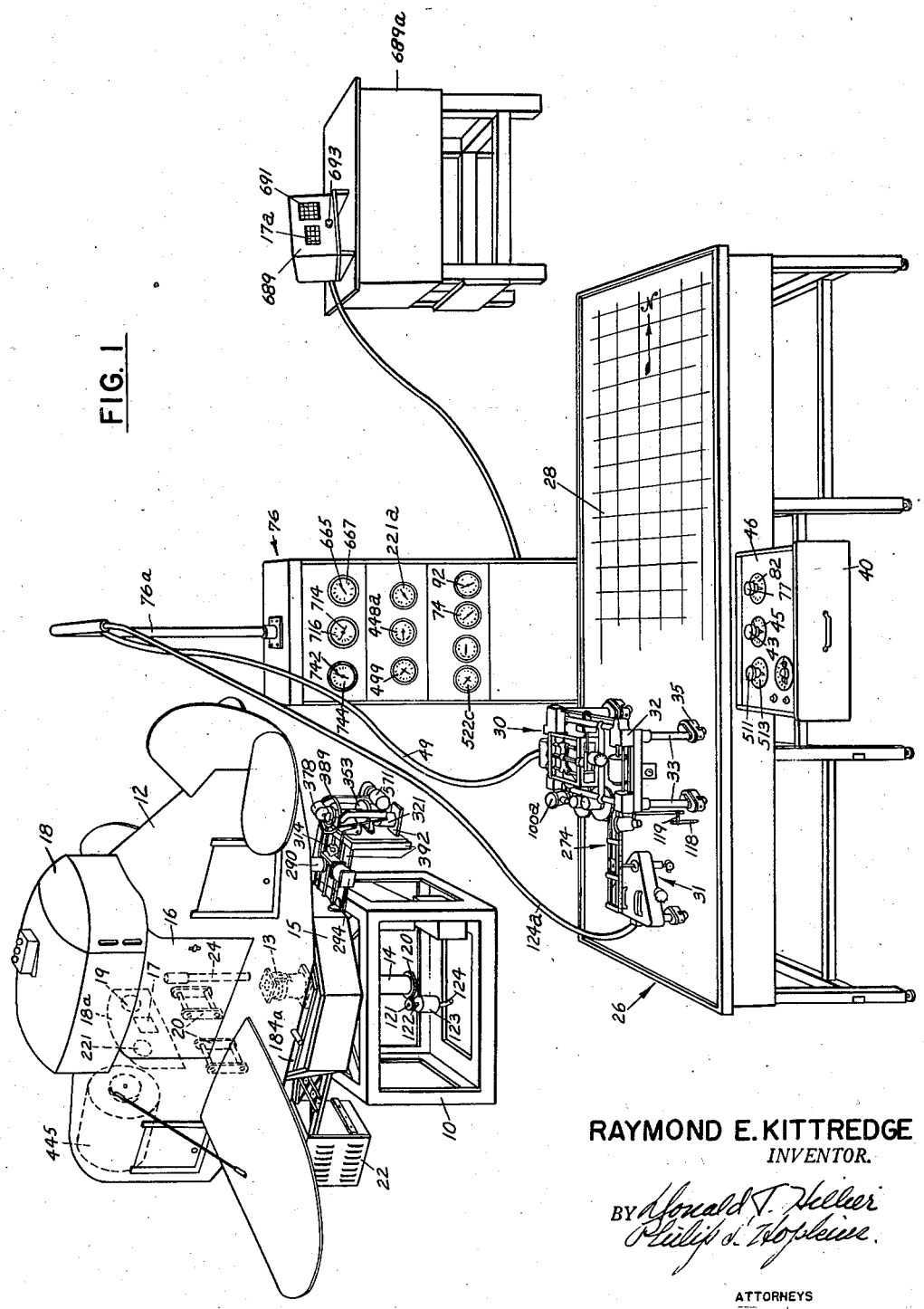
Fig. 1A is a detailed showing of the student's C scope and range meter.

Referring now to Fig. 1 it will be seen that my invention may include a trainer of the type generally referred to as a Link Trainer. This trainer which is assumed in the illustrated embodiment of my invention to be a radar equipped fighter plane comprises a stationary base 10 and a fuselage 12. The fuselage 12 is mounted upon a universal joint designated generally in Fig. 9 by 13 which in turn rests upon a main central spindle 14 rotatably mounted in base 10. Octagon 15 is attached to fuselage 12 for rotation therewith by means of cross arms 15a which are suitably attached to vertical spindle 14. The fuselage 12 is sufficiently large to accommodate a student who may enter the fuselage by means of door 16 and a seat (not shown) is provided within the fuselage for the student. A hood 18 may be used to completely encompass the student within the trainer so that in the "flying" of the same he must rely completely upon the instruments which are in the fuselage 12 in a position corresponding to the position of the instruments in a real plane. The radar indicating C scope is designated 17 and the range meter 19 and are mounted on the instrument panel 18a. Within the fuselage 12 are a pair of rudder pedals 20 which simulate the rudder pedals of a real plane. By a manipulation of these rudder pedals the student may energize the turning motor 22 to cause the fuselage 12, universal joint 13, spindle 14, cross arms 15a and octagon 15 to rotate relative to stationary base 10 in either direction about its vertical axis, just as the pilot of a real plane may correspondingly cause the plane to turn. Also, within the fuselage 12 there is provided a control stick or control column 24, as the case may be, by which the student may cause the fuselage 12 to dive or climb or bank relative to spindle 14, cross arms 15a, octagon 15 and base 10 in simulation of the diving, climbing or banking of a real plane in actual flight. The turning of fuselage 12 and associated parts is possible because of the rotatable mounting of spindle 14 in base 10, while the climbing, diving and banking of fuselage 12 are made possible by means of the mounting of the fuselage 12 upon the previously mentioned universal joint 13.

The previously mentioned United States Patents 1,825,462 and 2,099,857 disclose in detail means for causing the fuselage 12 to turn, climb, dive and bank in simulation of the movements of a real plane in actual flight. Therefore the movements of the rudder pedals and control stick by the student which control the position of fuselage 12 do not constitute a part of my invention except when combined in the manner to be later described for effecting the indications of the instruments in the fuselage 12 and particularly the indications of the radar indicating means.

Also shown in Fig. 1 is a large table 26 upon which is placed a chart 28 which preferably has engraved thereupon suitable lines of latitude and longitude, North on the chart being in the direction of the arrow.

The target recorder

Seen upon chart 28 is the target recorder designated generally 30 and the fighter recorder designated generally 31. The target recorder frame 32 is shown in Fig. 1 and the details of this recorder are shown in Fig. 2, to which reference is now made. It will be seen that this recorder comprises four upstanding legs designated generally 33, each of the legs 33 being identical in construction and therefore only one of them is shown in detail. Referring to the leg 33 shown in detail it will be seen that the legs 33 comprise a tubular member 34 to the lower end of each of which is rigidly attached the housing 35. Each tubular member 34 is rotatably mounted in the frame 32 of the target recorder. Upon the upper end of each tube 34 is rigidly affixed a worm gear 36 driven by a worm 37. For each leg 33 a horizontal shaft 38 is provided, rotatably supported by the lower extremities of its housing 35 and a wheel 39 is rigidly mounted upon each of these shafts, the vertical axis of each wheel 39 being coincident with the vertical axis of the associated tube 34.

Means will now be described for simultaneously driving each of the worms 37 which by means of its associated worm gear 36, tube 34 and housing 35 changes the position of its associated wheel 39 about its vertical axis in order that the direction of travel of the target recorder 30 over the chart 28 may be varied as desired by the instructor.

Referring to Fig. 1 it will be seen that table 26 is provided with a drawer 40 which contains a plurality of controls for the use of the instructor. This control drawer is shown in detail in Fig. 3 to which reference is now made. In drawer 40 there is provided a variac or auto transformer 41 having a central shaft 42 upon the upper end of which is affixed Target Rate of Turn control knob 43. A pointer 44 is affixed to shaft 42 for rotation therewith, this pointer being arranged for movement over a scale 45 which is attached to the top panel 46 of drawer 40. Scale 45 is calibrated to show the simulated rate of turn of target recorder 30 in terms of conventional aircraft turn indicator needle widths. Variac 41 is connected by means of cable 47 to the reversible variable speed target turn motor 48 shown in Fig. 2. Cable 47 may be contained in cable 49 shown in Fig. 1. The schematic connection of control knob 43, variac 41, cable 47 and target recorder turn motor 48 is also shown in Fig. 4.

Knob 43, pointer 44, dial 45, shaft 42 and variac 41 are so arranged that when pointer 44 is opposite an index mark upon dial 45, no voltage is placed across motor 48, and therefore the motor does not run. When pointer 44 is placed to one side of this index, the circuit is such that the motor runs in one direction, the speed of the motor depending upon the distance that the pointer is placed from the index mark. On the other hand, when the pointer is placed to the other side of the index mark, the direction of output of the motor is reversed and its speed is in accordance with the magnitude of movement of the pointer from the index. The details are not shown because they can easily be supplied by one skilled in the art.

In Fig. 2 it will be seen that the output shaft 50 of the target turn motor 48 has affixed thereupon worm 51 which drives worm gear 52 rigidly attached to horizontal shaft 53 upon the left end of which is mounted spur gear 54 meshing with a driven spur gear 55 affixed upon horizontal shaft 56 which is carried by the frame 32 of target recorder 30 and which runs the entire width of the target recorder. Affixed upon each end of shaft 56 is a bevel gear 57, each of which drives a second bevel gear 58 rigidly affixed to a shaft 59, the shafts 59 being parallel with each other and perpendicular to shaft 56. Affixed upon each of these shafts 59 are two of the worms 37 which have been previously mentioned.

Thus by virtue of the just described arrangement whenever the output shaft 50 of the target turn motor 48 is rotated, worms 37 will simultaneously rotate each of the legs 33 of the target recorder in the same direction and through the same angular distance, thereby causing a change in the direction of the travel of the target recorder 30 over chart 28. Inasmuch as the turn motor 48 is reversible and of the variable speed type, the instructor may control the direction of turn of the target recorder as well as the rate of change of direction.

It should be borne in mind, however, that the whole target recorder 30 does not rotate about its vertical axis but rather that the tubes 39 are rotated with respect to the recorder frame, thus changing the direction of travel of the wheels 39 over the chart. The recorder frame 32 at all times remains in the same angular position relative to the lines of latitude and longitude upon the chart 28 at which it is placed when the "problem" is first set up.

Still referring to Fig. 2, there is rigidly affixed upon the middle portion of shaft 56, which is driven by turn motor 48, a bevel gear 60 which drives a second bevel gear 61 affixed upon the forward end of shaft 62 which lies perpendicular to shaft 56. Upon the rearward end of shaft 62 is worm 63 which drives worm gear 64, this worm gear being rigidly mounted upon the upper end of vertical shaft 65. Upon the lower end of vertical shaft 65 is mounted spur gear 66 which drives a second spur gear 67. This last spur gear is mounted upon the input shaft 68 of target heading transmitter teletorque 69 which is connected by means of cable 70 to target heading receiving teletorque 71 shown in Fig. 3. Affixed upon the output shaft (not shown) of receiving teletorque 71 is needle 73 which is free to move over dial 74 which is mounted in the front panel 75 of the instructor's instrument box 76, upon the top of which is the gooseneck 76a provided to allow swinging movements of the cables 49 and 124a. Dial 74 is calibrated in degrees from zero through 360 and the combination of needle 73 and dial 74 which form the target heading indicator may be referred to by the instructor to ascertain at any time the instant assumed heading of the target. The schematic connection of the target recorder, target heading transmitter 69, cable 70, target heading receiver 71 and target heading indicator is shown in Fig. 4.

By the immediately foregoing described arrangement, the instant heading of the target recorder is shown by the target heading indicator needle and dial which may be viewed by the instructor.

This invention therefore discloses a target recorder with means for changing at a desired rate and in either direction the heading of the recorder over a chart, together with means for indicating to the instructor the instant heading of the target recorder.

Means will now be described whereby the rate of travel of the target recorder 30 over the chart may be selectively altered by the instructor.

Figure 3:
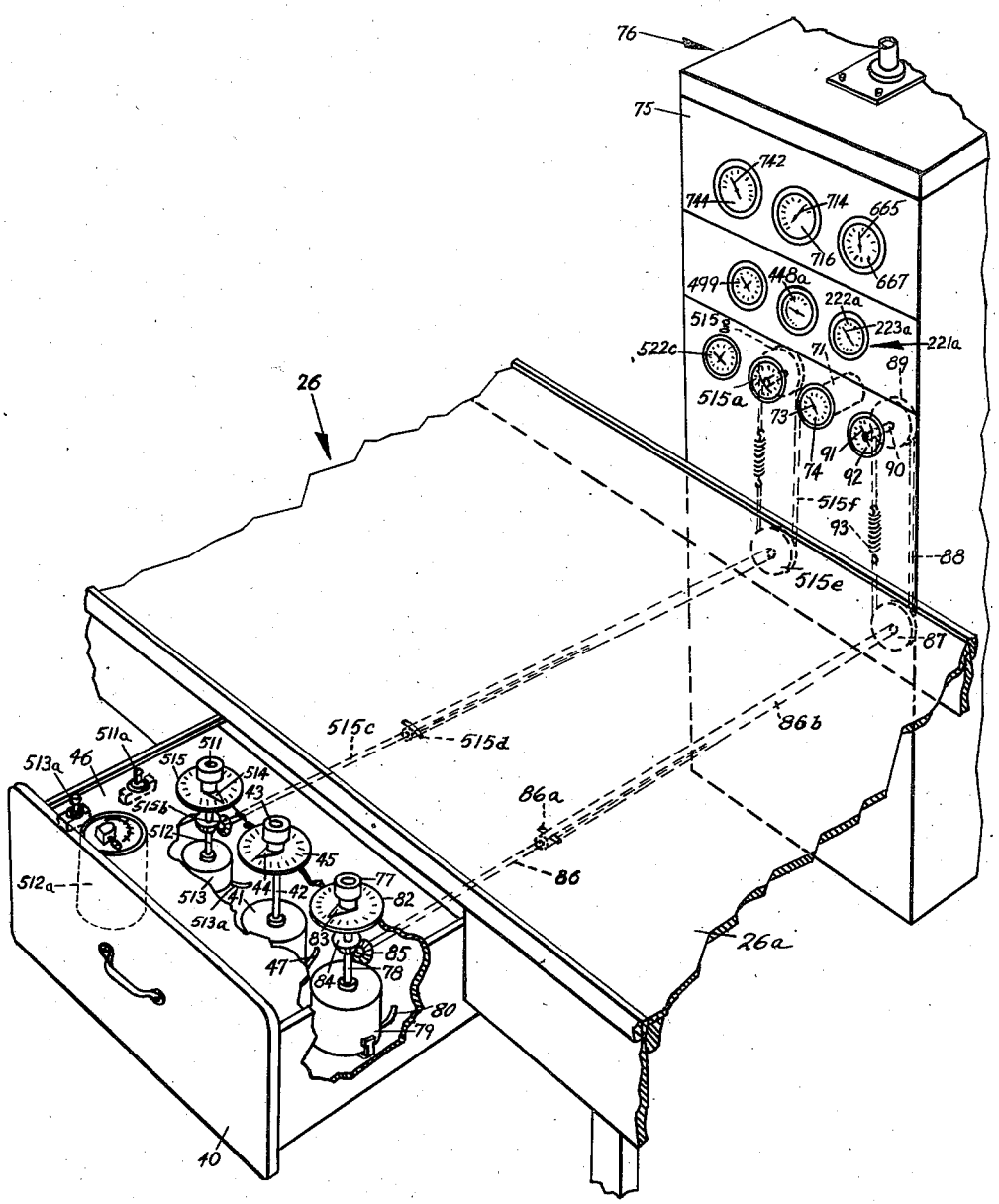
Fig. 3 is a view of the instructor's control panel and information panel.
Figure 4:
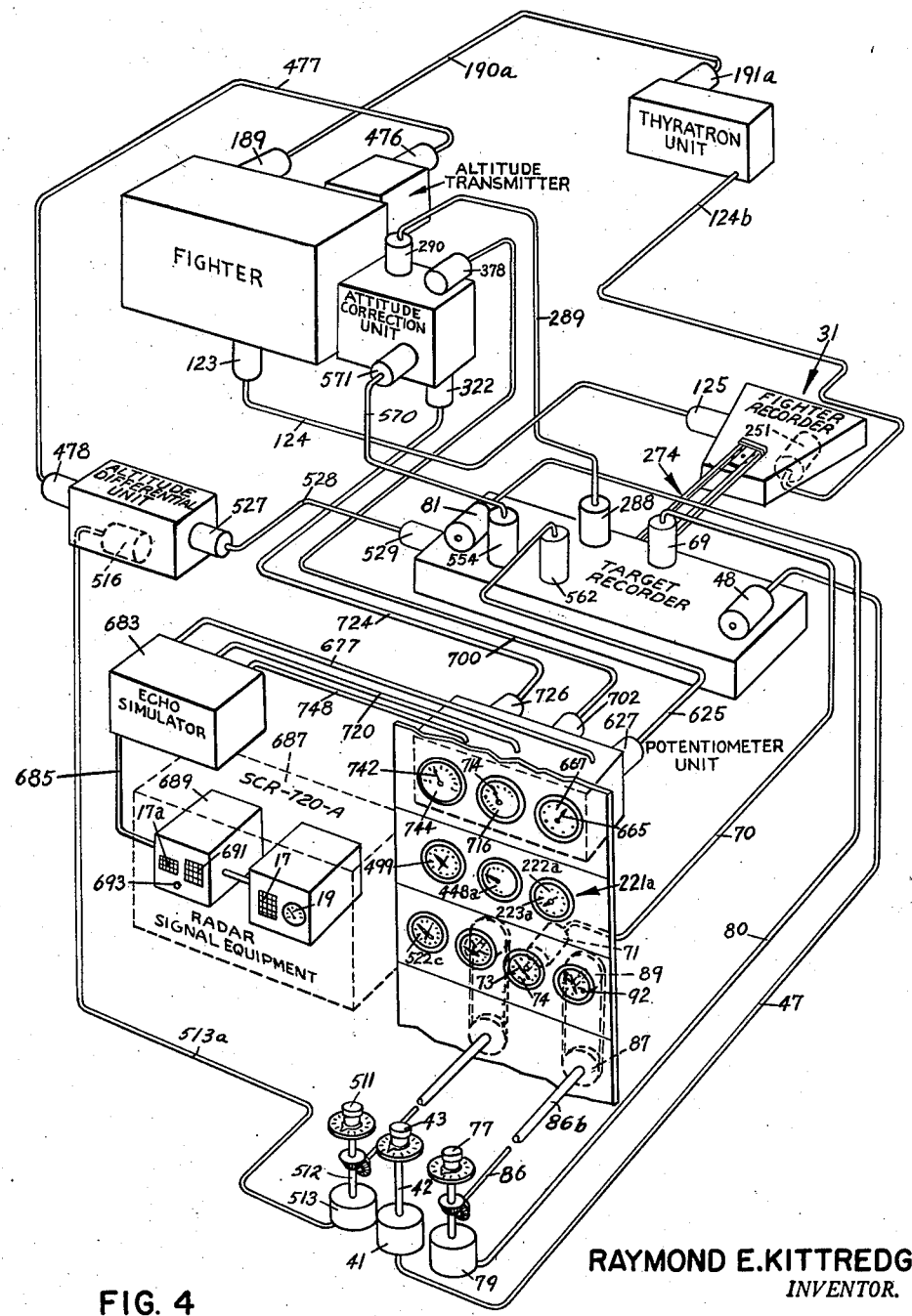
Fig. 4 is a diagrammatic showing of many of the important parts of this invention.

Referring to Fig. 3 which shows the instructor's control panel, there is provided a target recorder air speed control knob 77 affixed upon the top of vertical shaft 78 which controls the rotor (not shown) of variac or auto-transformer 79 which is connected by means of cable 80 to the target recorder drive motor 81 shown in Fig. 2. The diagrammatic connection of target recorder speed control 77 and variac 79, cable 80 and target recorder drive motor 81 is shown in Fig. 4. By changing the position of knob 77, the instructor may change the speed of target recorder drive motor 81. A dial 82 graduated in miles per hour is mounted upon the top panel 46 of the instructor's control drawer 40 and pointer 83 is mounted upon shaft 78 to be turned therewith. By means of this dial and pointer the instructor may govern the rate of drive motor 81 so that the target recorder 30 moves over chart 28 at a speed proportional to any desired assumed air speed of the target plane which is represented by the target recorder.

Also mounted upon vertical shaft 78, as seen in Fig. 3, is bevel gear 84 which drives a second bevel gear 85 which is mounted upon the end of a shaft 86 which extends under the top 26a of the table 26. Shaft 86 has affixed upon its inward end a transverse pin 86a which fits inside a slot (not shown) in the end of tube 86b. Both the shaft and pin are suitably rotatably held, the pin and slot arrangement permitting opening and closing of the drawer 40. Mounted upon the inner end of tube 86b is a pulley wheel 87 around which is wrapped a suitable belt 88 which also extends around a second pulley wheel 89 mounted within the instructor's instrument panel 76 upon shaft 90 which is turned by pulley wheel 89, and a needle 91 is mounted upon the fore end of shaft 90 to be moved thereby over the face of dial 92 which is graduated in miles per hour. Spring 93 is provided to prevent any lost motion between the rotation of pulley wheel 87 and the consequent rotation of pulley wheel 89. By referring to the needle 91 and dial 92 the instructor may determine at any time the assumed rate of travel in miles per hour of the target plane which is represented by the target recorder 30.

By virtue of this arrangement the instructor may, therefore, by a movement of the target recorder speed control knob 77 change the speed of target recorder drive motor 81 and at the same time by means of needle 91 and dial 90 the instructor may determine the assumed air speed of the target plane which is proportional to the speed of target recorder drive motor 81.

Means will now be disclosed for moving the target recorder 30 over the chart 28 at a speed dependent upon the speed of motor 81 and therefore in accordance with the setting of target speed control 77 and target air speed indicator 90, 91. Referring to Fig. 2 it will be seen that the output shaft 94 of target recorder drive motor 81 has mounted thereupon worm 95 which drives worm gear 96. By means of shaft 97 and gear 98, gear 99 which is the primary input of differential 100 is driven. The output shaft 101 of differential 100 is accordingly driven thereby driving the gears 102 and 103. The rotation of gear 103 drives shaft 104 which extends the entire width of the target recorder 30 and which is suitably carried by the frame 32 of this recorder. Upon either end of shaft 104 is a bevel gear 105 and each of these bevel gears drives a second bevel gear 106. Each of the gears 106 in turn drives a shaft 107 which runs perpendicular to shaft 104 and parallel to the previously described shafts 59. Upon each of the shafts 107 there is mounted a pair of worms 108 and each of these four worms drives a worm gear 109. Each of the worm gears 109 is rigidly mounted upon the upper end of a vertical shaft 110. Each of these shafts 110 extends inside and axially of the vertical tubes 34 which form a part of the vertical recorder legs 33.

Upon the lower end of each of the shafts 110 is a spur gear 111 which drives a second spur gear 112, the gears 111 and 112 being within the associated housing 35. By means of the shafts 113 each of the gears 112 drives a bevel gear 114 and each of the bevel gears 114 in turn drives a bevel gear 115 which is rigidly affixed upon one of the horizontal shafts 38 in the lower part of the housing 35. As previously explained, there is a wheel 39 mounted upon each of the shafts 38. Each of the vertical shafts 110 is free to turn within the associated worm gear 36, which, it will be recalled, is affixed to the top of its associated tube 34.

It will therefore be understood that the target drive motor 81, through the just described arrangement, will drive each of the wheels 39 at the same rate and of course the target recorder 30 will move over the chart 28 at the rate which the instructor has, by means of the target recorder speed control 77, set the target drive motor 81 to run. As previously pointed out, the assumed speed of the target which is proportional to the speed of the target recorder 30 is shown by means of the target speed indicator 90, 91.

It will be understood that when the target recorder turn motor 48, which is under the control of the instructor by means of target recorder control knob 43, is running, housing 35 and gears 112, 114 and 115 swing about the vertical axis of wheel 39 and of tube 34. This turning movement, as a result of the co-action of gears 111 and 112 would cause wheel 39 to run either faster or slower than the speed of target recorder drive motor 81 and of shaft 110 would otherwise require. If the turn were in one direction the speed of wheels 39 would be faster than they should be while if the turning were in the opposite direction the speed of the wheels 39 would be slower. The following arrangement prevents the turning of the housings 35 about the axes of tubes 34 from introducing into the rate of target recorder travel this undesired component.

Still referring to Fig. 2, it will be seen that there is mounted upon the right end of shaft 56 a spur gear 116 which drives the gear 117 which forms the secondary input of the target speed drive differential 100. The rate of turning of the wheels 39 is in accordance with the output of differential 100. Inasmuch as shaft 56 is rotated whenever the target turn motor 48 is running the secondary input gear 117 of the target speed differential 100 will be in motion. If the target turn motor 48 is running in one direction, the output of target speed recorder differential is greater by an amount exactly sufficient to offset the slowing down of the target recorder drive wheels 39 as a result of the turning of housings 35. If on the other hand the target turn motor 48 is running in the opposite direction the input gear 117 of the target recorder speed differential 100 moves in the opposite direction and the output of its differential is decreased by an amount exactly sufficient to overcome the increased rate of turning of the drive wheels 39 as a result of the turning of the housings 35 in that direction.

Referring now to Fig. 1, a marking member 118 is suitably held by a clamp 119 to one of the legs 33 of the target recorder 30. This marking member traces upon the chart 28 the path of the target recorder.

Also shown in Fig. 2 are a pair of light sources 100a, including the projecting elements 100b, each angularly mounted to emit a ray of light which intercepts the chart 28 at the point coincident with the vertical axis of sleeve 283. This point represents the exact instant assumed position of the target plane.

This invention therefore discloses a target recorder arranged to move over a chart, map or the like at a speed under the control of an instructor. This speed of movement which is proportional to the assumed speed of a target plane is shown upon an indicator which may be viewed by the instructor. The instructor may also control the direction of the target recorder as well as the rate of change of direction of the target recorder in accordance with the assumed rate of change in direction of a target plane. An indicator is provided to be viewed by the instructor for ascertaining the instant assumed heading of the target body, and a suitable marking device is provided to trace the path of the recorder over the chart.

The fighter recorder

Referring now to Fig. 1, it has been mentioned that the fighter recorder is designated generally 31. In Fig. 1 there is shown a gear 120 which is affixed upon the lower end of spindle 14 which turns whenever the trainer fuselage 12 is rotated with respect to the stationary base 10. This rotation of fuselage 12 is accomplished, as has been explained, by the student in the trainer manipulating the rudder pedals 20. Meshing with gear 120 is a second gear 121 which is affixed upon the input shaft 122 of the fighter heading transmitting teletorque 123. This transmitter is connected by means of cable 124 to the fighter heading receiver teletorque 125 shown in Fig. 5. The schematic connection of fighter heading transmitter 123, cable 124, fighter heading receiver 125 and the fighter recorder 31 is shown in Fig. 4, and cable 124 may be contained in the cable 124a shown in Figs. 1 and 5. A suitable junction box 124c is affixed upon recorder 31. Referring now to Figs. 5 and 5A, the output shaft 126 of the fighter heading receiver 125 has affixed thereupon a disc 127 to which is attached an arm 128 carrying a contact roller 129. Whenever the fuselage 12 is rotated about its vertical axis the input shaft of the fighter heading transmitter 123 is rotated and as previously explained this will result in a rotation of the output shaft 126 of the receiver 125 through the same angle and in the desired direction. The rotation of this output shaft 126 of course results in a rotation of the contact roller 129. A pair of contact segments 130 and 131 are provided and contact roller 129 bears against one of these segments or both of them at all times, depending upon their relative angular positions. The segments 130 and 131 are insulated from one another by virtue of the spaces 131a therebetween. These two segments are carried by the insulating disc 132 mounted upon shaft 133 for rotation therewith. An outer brush ring 134 and an inner brush ring 135 are provided, each of these rings being carried by the insulating disc 132. The outer ring 134 is in electrical contact with the segment 131 by virtue of the pins 136 while the inner ring 135 is in contact with the segment 130 by virtue of pins 137. Inner ring 135 is placed inside outer ring 134 concentric therewith and is insulated therefrom by suitable spacing. Outer collector brush 138 bears at all times against outer brush ring 134 while inner brush 139 similarly contacts inner brush ring 135. Each of these brushes is connected to the reversible drive motor 141, the coil housing of which is 141a, by means of the conductors 140. The output shaft 142 of the reversible drive motor 141 has mounted thereupon a worm 143 in mesh with worm gear 144 which is affixed upon shaft 133. Another gear 146 is also mounted upon shaft 133 to be turned thereby.

In the operation of the mechanism shown in Fig. 5A, when contact roller 129 contacts both of the segments 130 and 131 motor 141 is not energized. However, when trainer fuselage 12 is rotated resulting in a rotation of the input shaft 122 of fighter heading transmitter 123 shown in Fig. 1 the output shaft 126 of the fighter heading receiver 125 shown in Fig. 5A also rotates and contact roller 129 is moved so that it contacts only one of the segments 130 or 131. Assuming that contact roller 129 contacts only segment 130, by means of pins 137 inner collector ring 135, brush 139 and the conductor 140 which connects this brush to motor 141, motor 141 is energized to turn in a given direction. The operation of motor 141 results in a rotation of shaft 142 and gear 143. Gear 143 drives gear 144 and shaft 133. The driving of shaft 133 simultaneously drives output gear 146 as well as the collector rings 134 and 135, insulating disc 132 and the contact segments 130 and 131. Motor 141 will continue to run until the collector rings, insulating disc and gear segments 130 and 131 are rotated to such a position that both of the segments 130 and 131 contact the contact roller 129. At this point the drive motor 141 stops.

If, on the other hand, the rotation of the trainer fuselage 12 were in such a direction that the contact roller contacted solely the segment 131, motor 141 would be energized to turn in the opposite direction. It would simultaneously rotate the output gear 146 and the collector assembly but the direction of rotation would be reversed. Motor 141 would continue to run until the contact segments 130 and 131 were again positioned so that contact roller 129 was in engagement with both of these segments. At this instant the motor 141 would stop. It will be appreciated that the rotation imparted to the output gear 146 is in a direction dependent upon the direction of rotation of the fuselage 12, and that the gear 146 is rotated an amount directly proportional to the magnitude of the rotation of the fuselage 12 about its vertical axis.

Referring now to Fig. 5, it will be seen that the output gear 146 which is driven by the follow up motor 141 drives a reversing gear 147 which meshes with a gear 148 which is affixed upon shaft 149 suitably carried by the housing 150 of the fighter recorder. The handle is designated 151a. Upon either end of shaft 149 is a bevel gear 151 and each of these bevel gears meshes with a second bevel gear each designated 152. Each of the gears 152 is mounted upon the upper end of a vertical shaft 153, upon the lower end of which is mounted a gear 154. Meshing with each of the gears 154, only one of which is shown in Fig. 5, is a gear 156 which is attached to the housing 157. In the lower end of each of the housings 157, only one of which is shown, is mounted a horizontal shaft 159 upon each of which is rigidly mounted a drive wheel 160. These wheels rest upon the chart 28.

With the just described construction, whenever the trainer fuselage 12 is rotated about its vertical axis, which movement simulates the turning of the radar equipped plane in flight, the trainer heading transmitter 123 causes a change in the position of the contact roller 129 relative to the segments 130 and 131 proportional to the magnitude of the rotation of the fuselage. Follow-up motor 141 is energized, the direction of turning of the output shaft 142 of this follow-up motor being dependent upon the direction of rotation of the trainer fuselage 12 and the total output being dependent upon the magnitude of the rotation of the fuselage. By means of the gear train and shaft interposed between the follow-up motor 141 and the housings 157 which house the wheels 160, the rotation of the trainer fuselage and the consequent energization of the follow-up motor 141 results in a rotation of the wheels 160 about their vertical axes. Both of the wheels 160 rotate about their vertical axes in the same direction and through an angular distance exactly equal to the rotation of the fuselage 12.

At the same time that the two housings 157 and the two wheels 160 are rotated, by means of the bevel gears 161, 162, shaft 163, bevel gears 164 and 165, vertical shaft 166 and gears 167 and 168, the vertical shaft 169 which is suitably carried by bearings held by the recorder housing 150 is also turned in the same direction and through the same angle as the housings 157. Upon the lower end of shaft 169 and pivotally attached thereto by means of stud 169a, as best seen in Fig. 5C, is the member 169b which carries shaft 169c upon the outer ends of which are rotatably mounted the wheels 170. Member 169b has a pair of rearwardly extending arms 171 carrying the stud 171a upon which is pivotally mounted between the arms 171a bell-crank like member 171b. A spring 171c has one end attached to shaft 169 and the other end to the upper end of bell-crank 171b. The front end of bell-crank 171b is forked and inking wheel 171d is rotatably mounted in the fork. Inking pad 171e is carried by wire 171f, the rear end of which may be pivoted about stud 171a. A hole is provided in one of the members 171 and a pin 171g affixed to bell-crank 171d projects therethrough.

With this arrangement the wheels 170 support the third corner of the recorder on the chart 28, and the spring keeps inking wheel 171d in contact with the chart. The weight of the recorder does not rest upon the chart, and so it is possible to use a sharp inking wheel without cutting the chart 28. Inking pad 171e at all times contacts wheel 171d to keep it moist. Pin 171g limits the movement of bell-crank 171b caused by the tension of spring 171c.

Inking wheel 171d is arranged so that when the recorder 31 rests upon chart 28 the part of the inking wheel in contact with the chart is immediately below the axis of vertical shaft 169, and this point of contact represents the exact assumed position of the radar equipped fighter plane represented by the fuselage 12.

It will be appreciated that as the drive wheels 160 are turned about their vertical axes with a turning of fuselage 12, supporting wheels 170 and inking wheel 171d turn in the same direction and through the same angle.

Affixed upon the top of the recorder 31 is a scale 172 and a pointer 173 is affixed upon shaft 169 to turn therewith. Scale 172 is calibrated in degrees from zero through 360 and by means of pointer 173 and scale 172 the instant heading of the fighter 12 may be determined by the instructor.

This invention therefore discloses means whereby when the trainer fuselage 12 is rotated about its vertical axis the heading of the fighter recorder 31 upon the chart 28 is similarly changed. The detailed arrangements are such that the wheels 160, 170, and 171d rotate about their vertical axes in the same direction and through the same angle as does the fuselage 12.

Figure 6:
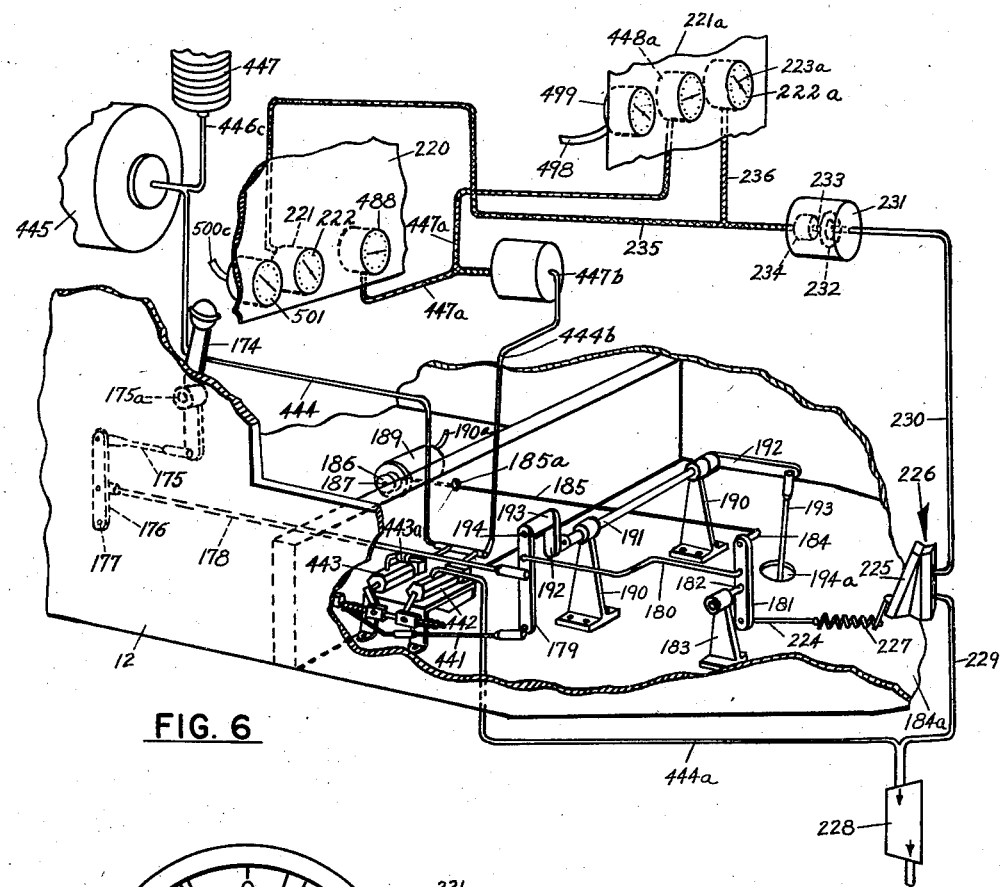
Fig. 6 illustrates some of the mechanism of the Link trainer.

Means will now be described for varying the rate of travel of the fighter recorder 31 over the chart 28 in accordance with the assumed air speed of the fuselage 12. Referring to Fig. 6 a portion of the fuselage 12 is shown and it will be seen that pivotally mounted within the left side thereof ahead of the position occupied by the student is a simulated throttle control lever 174 pivotally mounted about a shaft 175 carried by the side of fuselage 12. Pivotally attached to the lower end of the simulated throttle control lever 174 is a forwardly extending link 175 which is pivotally mounted to the upper end of arm 176 which is pivotally attached to the inside of the fuselage 12 at the point 177. Pivotally connected to the arm 176, as shown, is a rearwardly extending link 178, the rear end of which is pivotally attached to the pitch action walking beam 179. Pivotally attached to the pitch action walking beam 179 is the rearwardly extending link 180, the rear end of which is pivotally attached to the arm 181 mounted upon shaft 182 which is carried by bracket 183 suitably attached to the bottom 184a of the trainer fuselage 12. To the upper end of arm 181 is attached a stub shaft 184 to the end of which is attached a cord 185 which passes through aperture 185a winds around and is attached to a pulley 186 mounted upon the input shaft 187 of the fighter air speed transmitting teletorque 189. Pulley 186 and the input shaft 187 are spring biased in the counterclockwise direction.

Also affixed to the bottom 184a of the trainer fuselage 12 are a pair of brackets 190 which carry the rotatable shaft 191. Upon the right end of shaft 191 is affixed arm 192 and upon the rearward end of arm 192 is pivotally attached the vertical link 193 which extends through the hole 194a in the bottom of fuselage 12, the lower end of link 193 being affixed to the rear end of arm 15a shown in Fig. 9. Arm 15a, as has been previously explained, rotates with the trainer fuselage 12 but does not pitch or bank therewith.

Upon the left end of shaft 191 is mounted the arm 192 and stub shaft 193 is rigidly affixed to the upper end of this arm. The pitch action walking beam 179 is pivotally attached to the left end of arm 193 at the point 194.

Referring to Fig. 6 it will be understood that when the student in the fuselage 12 pushes the upper end of the simulated throttle control lever 174 ahead (to the left in Fig. 6), which motion simulates an increased power setting in a plane in actual flight, the upper end of arm 181 moves to the rear of the fuselage 12 or to the right as seen in Fig. 6. On the other hand an opposite movement of the simulated throttle control lever 174 results in a movement of the upper end of lever 181 toward the head of the fuselage 12 or to the left in Fig. 6. At the same time it will be understood that if the fuselage 12 is pitched in simulation of the diving of a plane in actual flight, by virtue of link 193 and arm 192, shaft 191 is rotated clockwise as seen in Fig. 6 from the left side of the fuselage 12. The upper end of arm 181 is therefore moved to the right—in the same direction that the upper end of this arm is moved when the simulated throttle lever 174 is pushed ahead. On the other hand, when the trainer fuselage 12 assumes a climbing position the upper end of arm 181 moves to the left in Fig. 6—the same direction that it moves when the simulated throttle lever 174 is moved toward the rear to simulate a decrease in power setting.

In a plane in actual flight an increase in power setting as well as a diving of the plane results in an increase in the air speed of the plane. On the other hand, a decrease in power setting or a climbing of the plane results in a decrease in the air speed of the plane. This being so, it follows that the upper end of arm 181 moves in accordance with changes in the assumed air speed of the fighter 12. When the upper end of arm 181 moves to the rear the assumed air speed of the fighter is greater and when the upper end of this arm moves toward the head of fuselage 12 the assumed air speed of the fighter is less.

Inasmuch as the upper end of arm 181 is connected by means of cord 185 to the spring biased pulley 186 attached to the input shaft 187 of the fighter air speed transmitter, the input shaft of this transmitter changes in accordance with changes in the assumed air speed of the fighter 12. When the assumed air speed increases, as a result of an increased power setting or a diving of the fighter, the input shaft moves clockwise through an angle proportional to the assumed increase. If the power setting is decreased or the fighter climbed, the tension upon cord 185 is decreased, and the spring bias means rotates the pulley 186 and input shaft 187 counterclockwise through an angle proportional to the assumed decrease in air speed of the fighter.

Figure 7:
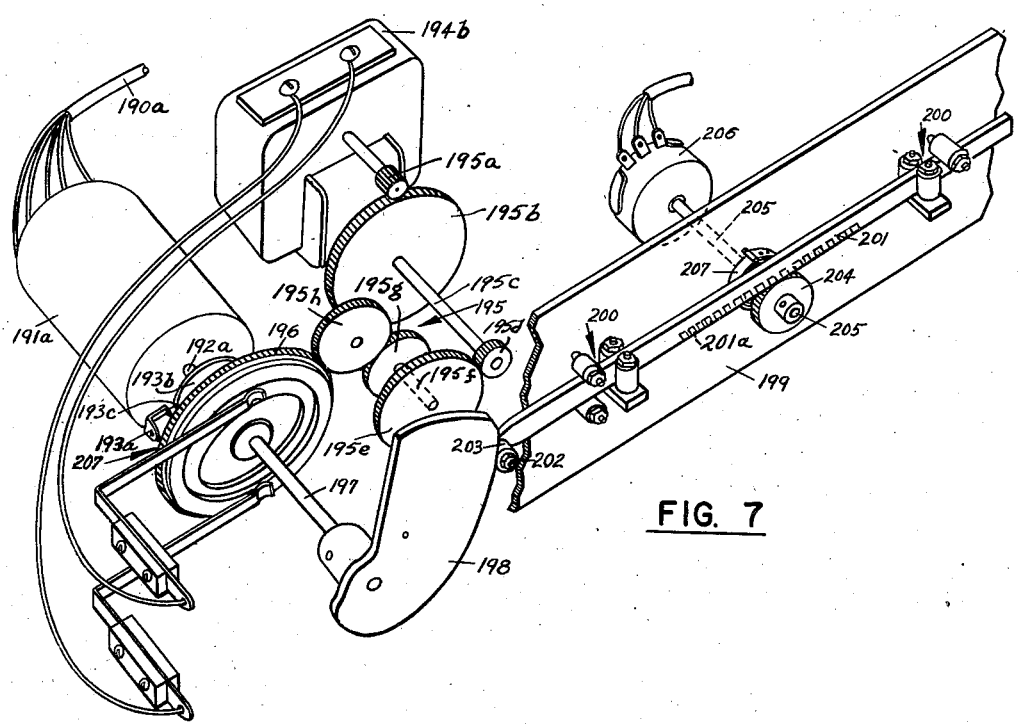
Figs. 7 and 8 are a showing of the fighter recorder speed control means.

As shown in Figs. 4 and 6, the fighter air speed transmitting teletorque 189 is connected by means of cable 190a to the fighter air speed receiving teletorque 191a also shown in Fig. 7 to which reference is now made. Fig. 7 shows a part of a thyratron control unit. Any change in the assumed air speed of the fighter 12 caused by a change in power setting or a change in the pitching attitude of the fighter will result in a rotation of the output shaft 192a of the fighter air speed receiver. The direction of this rotation and the magnitude thereof depend upon the direction of the change and the magnitude thereof. This rotation will result in a change in the position of contact roller 193a relative to the assembly designated generally 207, which assembly comprises a pair of contact segments, an insulating disc, a pair of collector rings, and a pair of brushes similar to the assembly described in connection with Fig. 5A. Roller 193a is carried by disc 193b and arm 193c which are affixed upon shaft 193d. The reversible follow-up motor 194b will be energized to turn in a direction depending upon the direction of rotation of shaft 192a, and by means of the gear train designated generally by 195 and including gears 195a, 195b, shaft 195c, gears 195d and 195e, shaft 195f, and gears 195g and 195h, the gear 196 which is integral with the insulating disc of assembly 207, the collector rings and the pair of contact segments will be rotated. Simultaneous with the rotation of gear 196, shaft 197 is rotated thereby rotating cam 198 which is affixed thereupon. Motor 194 continues to run and drive gear 196 as well as cam 198 until the contact segments of assembly 207 are returned to such a position that both of these segments contact the roller 193. At this instant motor 194 will stop.

Figure 8:
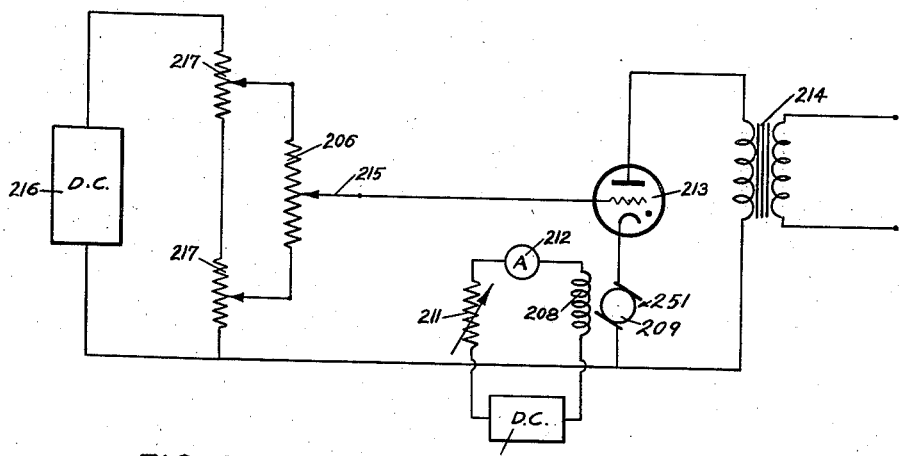

Still referring to Fig. 7 there is provided a frame member 199 carrying a plurality of guide rollers designated generally by 200, rack 201 being arranged to reciprocate along these rollers 200. Upon the left end of rack 201, as seen in Fig. 7, is provided a stub shaft 202 carrying a roller 203 which engages the surface of cam 198. Suitable teeth 201a are provided in the underside of rack 201, these teeth meshing with gear 204 which is affixed upon shaft 205. Potentiometer 206 which is connected to the electronic thyratron control unit shown in Fig. 8 is provided, the rotor of this potentiometer being mounted upon shaft 205 for rotation therewith. Shaft 205 is biased by means of spring 207 so that roller 203 is constantly urged against cam 198.

As the angular position of cam 198 is changed in response to a change in the assumed air speed of fighter 12 which results in an energization of drive motor 194, rack 201 is moved, thereby changing the position of the rotor of potentiometer 206. Reference is now made to Fig. 8 which shows in detail the thyratron control unit circuit.

In Fig. 8 the fighter recorder drive motor is designated generally 251, and is seen to comprise a field winding 208 and an armature 209. A suitable direct current source 210, rheostat 211 and ammeter 212 are provided in series with field winding 208 in order that the current through this field winding may be maintained constant. A thyratron tube which may be of the type 394A is designated 213 and it will be noted that the armature 209 is in series with the plate current of the tube. A transformer 214 is provided to supply the plate voltage. The grid of tube 213 is affixed to the center-tap 215 of the potentiometer 206 also shown in Fig. 8 and a suitable direct current source 216 places the desired voltage across potentiometer 206. A pair of potentiometers 217 are provided to adjust the voltage at the two ends of potentiometer 206. As the voltage upon the grid of tube 213 is changed as a result of an operation of the mechanism seen in Fig. 7 which responds to a change in the assumed airspeed of the fighter 12, the plate current of tube 213 changes as does the speed of the armature 209 of the fighter recorder drive motor 251. As the speed of armature 209 changes, the voltage developed thereacross changes in a linear fashion due to the constant field current. The speed of armature 209 stabilizes at a value which produces a voltage across the armature which when matched with the voltage from potentiometer arm 215 allows just sufficient current to pass through tube 213 so that this speed will be maintained. Thus the speed of recorder drive motor 251 is controlled by potentiometer arm 215, which, as previously shown, is positioned in accordance with the assumed air speed of the fighter 12.

The schematic connection of the fighter air speed transmitter 189, cable 190, fighter air speed receiver 191, thyratron control unit shown in Fig. 7, in Fig. 8 and the fighter recorder drive motor 251 is shown in Fig. 4. Fighter recorder drive motor 251 may be connected to the thyratron unit by means of cable 124b seen in Figs. 4 and 5. Cable 124b may be contained in cable 124a seen in Figs. 1 and 5.

As stated, the fighter recorder drive motor 251 has a speed proportional to the assumed air speed of the fighter 12. Referring to Fig. 5, by means of a right angle drive 252 the fighter recorder drive motor 251 rotates the shaft 253 which forms the input of the fighter recorder speed differential 254. The output of this differential rotates gear 255 which meshes with and drives gear 256 mounted upon horizontal shaft 257. A worm 258 is placed upon each end of shaft 257 and driven by each of these worms 258 is a worm gear 258a, each of which is affixed upon the upper end of a vertical shaft 259. (Only one of these vertical shafts 259 is shown in Fig. 5). Affixed upon the lower end of each shaft 259 is a spur gear 260 inside the housing 157. Meshing with each of the spur gears 260 is a second spur gear 261 mounted upon the upper end of a vertical shaft 262. Upon the lower end of each of these vertical shafts 262 is a bevel gear 263 which meshes with another bevel gear 264 and each of the bevel gears 264 is affixed upon a horizontal shaft 159 rotatably carried by housing 157. Drive wheels 160, as previously explained, are affixed upon the horizontal shaft 159. Each of the vertical shafts 259 is free to turn within the associated gear 156 which, it will be recalled, is affixed upon its associated housing 157 to turn the housing whenever the fighter recorder turn motor 141 is energized.

By virtue of the just described arrangement, it will be understood that the speed of rotation of the drive wheels 160 depends upon the speed of the fighter recorder drive motor 251. Inasmuch as the speed of the motor 251 depends upon the position of the simulated throttle control lever 174 as well as upon the climbing and diving position of the fuselage 12, it will be appreciated that the speed of the fighter recorder 31 over the chart 28 varies in accordance with changes in the assumed air speed of the fighter 12.

As in the case of the target recorder, means must be provided in order that the forward speed of the fighter recorder 31 over the chart 28 will not be increased or decreased as a result of the turning of the housings 157 shown in Fig. 5. It will be recalled that these housings turn in response to a turning of the fighter 12 about its vertical axis. It will be appreciated that a turning of the housings 157 will set the gears 261, 263 and 264 in motion, and that a turning of the housings give a rotation to the drive wheels 160 which would introduce an error into the speed of the fighter recorder 31 over the chart 28. The speed of the recorder would be increased when the housings turn in one direction and decreased when they turn in the opposite direction. This error is eliminated by the provision of the gear 265 mounted for rotation upon shaft 149. Gear 265 drives gear 266 which forms the secondary input of fighter recorder speed differential 254. Whenever the fighter recorder is turning in one direction, shaft 149 turns gears 265 and 266 to increase the output of the fighter recorder speed differential 254 by an amount exactly sufficient to overcome the slowing down of wheels 160 as a result of the turning of the recorder. On the other hand, when the fighter recorder is turning in the opposite direction, the direction of rotation of shaft 149 is reversed and gear 266 is turned to decrease the output of the fighter recorder speed differential 254 to offset the speeding up of wheels 260 as a result of the turning of housings 157.

The purpose of the cam 198 shown in Fig. 7 will now be described. Placed upon the instrument panel 220 in the fighter 12 is a simulated air speed indicator 221 which is shown in detail in Fig. 6A. It will be seen that this instrument comprises a dial 222 graduated from zero through 500 and a needle 223 is arranged to move over this dial in order to indicate the assumed air speed of the fighter 12 in terms of miles per hour. Inasmuch as the lever 181 moves in accordance with changes in the assumed air speed of the fighter 12, it follows that the movements of this lever may be used to determine the setting of needle 223 relative to the fixed dial 222. Accordingly there is pivotally connected to the bottom of lever 181 the link 224 which is connected to the movable portion 225 of the air speed regulating bellows 226 through the spring 227. Bellows 225 comprises a needle valve, as is well known in the art and disclosed in U. S. Patent 2,099,857, and this bellows is connected to a vacuum pump 228 by air connection 229. At the same time bellows 226 is connected by means of air line 230 to the air speed transmitter 231. The air speed transmitter 231 comprises a collapsible-expansible member 232 connected to line 230, and as this member expands or collapses it turns the input shaft 233 of the telegon transmitter 234 which is connected by cable 235 to a receiver telegon in air speed indicator 221 which is mounted upon the instrument panel 220 in fighter 12. The output shaft of the receiver telegon in instrument 221 has the hand 223 mounted thereupon. Also, telegon transmitter 234 is connected by cable 236 to a receiver telegon upon the output shaft of which is mounted the hand 223a which moves over dial 222a forming the air speed indicator 221a which, as seen in Fig. 1, is mounted in the instructor's instrument panel 76.

As previously pointed out, as the assumed air speed of fighter 12 increases, the upper end of lever 181 moves to the right in Fig. 6, and consequently the lower end of lever 181 moves to the left, as does link 224. The increased tension upon spring 227 results in a greater vacuum in bellows 225, member 232 is collapsed, thus rotating the input shaft 233 of transmitter 234. The output shafts of the receivers in the air speed indicators 221 and 221a are both rotated in such a direction that the needles 223 and 223a move clockwise over the dials 222 to indicate to the student in fighter 12 and to the instructor a greater assumed air speed of fighter 12. Decreases in the assumed air speed of fighter 12 are indicated upon the two air speed indicators by movements of the just described parts in the opposite directions. This system of air speed indication is well known in the art of ground aviation training.

Figure 6A:
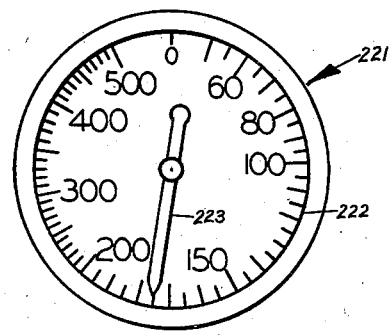
Fig. 6A shows the air speed indicator.

Referring to Fig. 6A it will be seen that the dials 222 and 222a of the simulated air speed indicators 221 and 221a are not uniformly graduated, as is the case of air speed indicators used in real planes, and as a result of this non-uniform graduation a given angular movement of lever 181 does not produce at all times the same change in air speed as indicated by the indicators 221. A given angular movement of lever 181 in the presence of a low indicated air speed will not produce as great a change in the indicated air speed as the same movement will in the presence of a relatively high indicated air speed. Further, because of the employment of pneumatic means, spring 227, bellows 226 and diaphragm 232 may not all respond linearly to the movements of lever 181.

It will be appreciated that the speed of the fighter recorder 31 over the chart 28 at all times must be proportional to the air speed as indicated by the indicators 221 and 221a. For this reason cam 198 shown in Fig. 7 is employed. This cam has such a curvature that for a given change in the indications of instruments 221 and 221a at any point in their range of operation, potentiometer 206, which controls the speed of recorder 31, is moved the exact amount necessary to change the speed of the recorder 31 proportionately. Thus the speed of the recorder is at all times proportional to the assumed fighter air speed as indicated by indicators 221 and 221a.

This invention therefore includes a recorder whose direction of travel over the chart 28 is responsive to the rotations of the fuselage 12 about its vertical axis, the rate of change of the direction of the fighter recorder 31 being in accordance with the rate of turning of the fuselage 12 and the direction of change of the course of the recorder 31 being in the same direction as the rotation of the fuselage 12. At the same time the speed of travel of the fighter recorder 31 over the chart 28 is responsive to changes in the assumed air speed of the fighter 12 and this speed is proportional to that indicated by the air speed indicator in the fighter 12.

*Means for introducing the factor of target compass bearing*

Target compass bearing has been defined as the angle between north and the horizontal projection of the line of sight from the fighter to the target measured clockwise through 360 degrees. This concept is illustrated in Fig. 2A where F represents the position on the earth immediately below the fighter, N represents the direction of the north pole and T represents the position upon the surface of the earth immediately below the target. The angle TCB is the target compass bearing. Means for introducing this angle into the mechanism of this invention will now be disclosed.

Reference is now made to Fig. 2 which discloses the target recorder 30 and the fighter recorder 31 and to Fig. 5 which is a detailed disclosure of the fighter recorder. In Fig. 5B it will be seen that a slot 270 is placed in the upper end of shaft 169 and protruding from this slot is arm 271. Shaft 169 is drilled for the reception of rod 272 which is integral with arm 271 and rod 272 is free to slide axially within the upper end of shaft 169. A ball 273 is integral with the upper end of rod 272 and a spring 272a is provided inside shaft 169 to force arm 271, stud 272 and ball 273 upwardly as shown in Fig. 5B. Referring now to Fig. 2, it is seen that the arm designated generally 274 connects the fighter recorder 31 with the target recorder 30. Arm 274 comprises two main side members 275 and three transverse members 275a. A plate like member 277 having suitable rollers 278 for movement along the track 279 formed by members 275 has a hollow depending member 276 attached thereto. This member 276 is drilled horizontally to allow the string 280 to pass therethrough, and a knot 280a is tied in the string to prevent the end of the string from pulling away from member 276. A bore 281 is provided in member 276 for the reception of the ball 273. By depressing arm 271, ball 273 may be removed from member 276, thus separating the fighter recorder 31 from arm 274. String 280 runs between the members 275 to the target recorder 30 to the center of the gear 282 to which the members 275 are rigidly affixed. When string 280 reaches the center of gear 282 its direction of travel is changed from horizontal to vertical by any suitable means, and it runs axially of the sleeve 283 which is attached to gear 282 and is suitably rotatably mounted in the recorder frame 32. A suitable pulley 284 carried by the frame of the target recorder 30 again changes the direction of travel of string 280—this time from vertical to horizontal. String 280 winds around wheel 285 and is suitably anchored thereto.

Still referring to the target recorder shown in Fig. 2, meshing with gear 282 is gear 286 which is affixed upon the input shaft 287 of the target compass bearing transmitting teletorque 288. Transmitter 288 is connected by means of cable 289 to the target compass bearing receiving teletorque 290 shown in Fig. 9. The schematic connection of target compass bearing transmitter 288, cable 289 and the receiver 290 is shown in Fig. 4.

As the input shaft 287 of target compass bearing transmitter 288 is turned, an error voltage is developed in target compass bearing receiver 290 and this error voltage is fed to servo-amplifier 291 by means of cable 292. This causes a voltage corresponding to the error voltage to be conveyed by cable 293 to the servo-motor 294. This voltage energizes the servo-motor resulting in a turning of its output shaft 311 which by means of worm 312, worm gear 295 and the input shaft 296 of the target compass bearing receiver 290 rotates the armature of the receiver until it has been rotated through the same angle as the input shaft of target compass bearing transmitter 288. At this point no error voltage is present, and motor 294 stops. The direction of rotation of motor 294 depends upon the direction of turning of the input shaft of target compass bearing transmitter 288, and the total rotation imparted to the output shaft 311 depends upon the magnitude of the rotation of input shaft 287. This system, being known per se to many fields of electro-mechanical art, is not here described in detail.

Thus the worm gear 313 which forms the secondary input of differential 314 is moved in a direction and through an angle corresponding to the movements of the input shaft 287 of the target compass bearing transmitter 288.

Referring now to Figs. 1, 2 and 2B, 5 and 5B, it has been stated that the point upon chart 28 contacted by inking wheel 171d which is directly below the ball 273 represents the exact assumed geographical location of the fighter 12. Similarly the point upon the chart 28 immediately below the axis of vertical sleeve 283 represents the instant geographical position of the target plane. The angle between an imaginary line drawn from the point of contact of the inking wheel upon chart 28 to north on the chart 28 and between the projection of the string 280 upon the chart 28 is the assumed target compass bearing, by definition. (The projection of string 280 upon chart 28 is the same as the horizontal projection of the line of sight from the fighter to the target.) As the target recorder 30 moves over the chart 28 so that the vertical axis of sleeve 283 moves in any direction except directly toward or away from ball 273, connecting arm 274 pivots about ball 273. Inasmuch as the frame 32 of target recorder 30 retains its preset orientation relative to the chart 28, gear 282 will be turned. On the other hand, if the fighter recorder 31 moves over the chart 28 so that ball 273 is moved relative to target recorder 30 except in any direction directly toward or away from the vertical axis of sleeve 283, connecting arm 274 will rotate gear 282. Combined movements of the target recorder 30 and the fighter recorder 31 impart a differential rotation to gear 282.

It may be concluded, therefore, that as the assumed position above the earth of the target plane changes, as represented by movements of the target recorder 30 over the chart 28, and as the assumed position above the earth of the fighter plane changes, as represented by the position of recorder 31 upon the chart 28, gear 282 is rotated by an amount proportional to the actual change in target compass bearing that would occur if a real target plane and if a real fighter actually changed their positions above the earth as represented by the movements of the target and fighter plane recorders. The input shaft 286 of the target compass bearing transmitting teletorque 288 is rotated accordingly and this rotation is transferred to the target compass bearing receiving teletorque 290 in Fig. 9. The servomotor 294 is energized in a direction and its output is proportional to the change in target compass bearing as determined by the movements of gear 282. The secondary input of differential 314 is moved in direction and magnitude representative of changes in the assumed target compass bearing.

*Means for introducing the factor of fighter heading and for combining target compass bearing and fighter heading to produce target relative bearing*

Target relative bearing has been defined as the angle between the horizontal projection of the fighter's longitudinal axis and the horizontal projection of the line of sight from the fighter to the target. This concept is illustrated in Fig. 2B to which reference is now made. Target relative bearing is obtained by subtracting the fighter heading from target compass bearing. When the target compass bearing or fighter heading angle is east of north, they are considered positive but when they lie west of north they are negative. Referring to Fig. 2B the angle designated Target compass bearing is a positive angle and represents the target compass bearing. The L—L' represents the horizontal projection of the longitudinal axis of the fighter, L being the nose of the plane, and the angle H represents the heading of the fighter. Inasmuch as angle H lies to the west of north, this angle is negative. By subtracting the negative angle H from the angle Target compass bearing, the angle Target relative bearing which represents the target relative bearing is obtained. Means will now be disclosed for combining the heading of the fighter 12 with the target compass bearing in order to produce the target relative bearing.

It has been previously shown that the secondary input of target relative bearing differential 314 is equal to the target compass bearing. In order to show that this differential 314 combines target compass bearing with the heading of the fighter to produce target relative bearing, it is only necessary to show that the primary input of differential 314 is equal to the heading of fighter 12.

This is clearly shown in Fig. 9 where the ring gear 323 which is rigidly affixed to the stationary casting 324 is shown. Casting 324 is suitably affixed to the stationary base 10 of the trainer. Gear 325 is affixed upon the lower end of vertical shaft 326 which is rotatably held by the cross piece 15a which revolves with the octagon 15 of the trainer. Upon the upper end of vertical shaft 326 is the bevel gear 327. Whenever the fuselage 12 rotates, gear 325 is rotated by stationary gear 323, resulting in a rotation of vertical shaft 326 and bevel gear 327 which drives bevel gear 328 affixed to the forward end of horizontal shaft 329. Horizontal shaft 329 is rotatably mounted inside worm gear 313 and forms the primary input of target relative bearing differential 314. Worm gear 313, it will be recalled, introduces the factor of target compass bearing into differential 314.

Therefore, target relative bearing differential 314 combines the assumed heading of the fighter 12 with the assumed target compass bearing which is represented by the relative angular positions of the fighter recorder 31 and the target recorder 30 upon the chart 28 so that the output shaft 315 of this differential moves in accordance with changes in assumed target relative bearing.

*Means for positioning a fighter airplane simulating member relative to a point representing the intersection of the axes of the fighter according to assumed target relative bearing*

It has been explained that the output shaft 315 of the target relative bearing differential 314 is positioned in accordance with the assumed target relative bearing. It will now be shown that an airplane simulating member is positioned relative to an assumed line of sight to a target simulating member in accordance with the assumed target relative bearing.

Referring to Figs. 9, 9A, 9B, 9C, 9D, 9E, 9F, 9G and 9H, it will be seen that integral with the bevel gear 317 which is upon the upper end of vertical shaft 318 is a spur gear 351 which drives the spur gear 352 suitably rotatably mounted in the frame 392 of the unit being considered which is referred to herein as the attitude correction unit. (Frame 392 is shown in Fig. 1.) Spur gear 352 drives a larger spur gear 353 which is rigidly affixed to the vertical shaft 354 which is rotatably mounted in the yoke 355 which is attached to frame 392. Yoke 355 has two ears 355a affixed thereto, but hereinafter the entire assembly will be referred to as "yoke 355." This shaft has two grooves 356 and 357 upon opposite sides of the shaft. A pair of splines 358 and 359 are provided, these splines being positioned in respective ones of the grooves 356 and 357 for movement parallel with the axis of vertical shaft 354, which axis is designated as X—X.

It will be seen that each of the splines 358 and 359 has formed integrally therewith an ear 360 or 361 and pivotally attached to each of the ears 360 and 361 is a generally vertically extending push rod 362 or 363. Rigidly affixed upon the upper end of vertical shaft 354 is the lower U-shaped member 365 forming a part of a universal joint. Ring 366 is pivotally held by U-shaped member 365 by means of pivots 367 and 368 so that ring 366 is free to rock relative to the member 365 about the axis A—A. Concentric with the ring 366 and extending therearound is a second ring 369 and a pair of pins 370 and 371 whose longitudinal axes form the axis T—T'.

The ring 369 in the unit being considered, is the fighter airplane simulating member. The axis T—T' of this ring, formed by pins 370 and 371, is considered to be the transverse axis of the fighter 12, and the axis L—L' is drawn to represent the longitudinal axis of the fighter 12, the L end of the axis representing the forward end of fighter 12. It will be seen that the ears 372 and 373 to which the push rods 362 and 363 attach are to the rear of the assumed transverse axis of the fighter represented by ring 369. The axes T—T' and L—L' intersect at F. It will be recalled that the output shaft 315 of the target relative bearing differential 314 is at all times positioned according to the assumed target relative bearing. Thus by means of gears 316, 317, 351, 352 and 353 the vertical splined shaft 354 is similarly positioned according to target relative bearing. Then, by means of yoke 365, pins 367 and 368, ring 366 and the pins 370 and 371, the axes L—L' and T—T' of the fighter simulating member 369 are always positioned relative to the point F according to target relative bearing.

At the same time that the axis L—L' is always positioned relative to the point F according to target relative bearing, it will be appreciated that by means of gears 316, 317, the vertical shaft 318 and gears 319 and 320, the housing 321 of the azimuth transmitting teletorque 322 is positioned relative to the input shaft 400 in accordance with target relative bearing.

*Means for positioning the airplane simulating member relative to the point F according to the pitching and banking movements of the fighter plane*

Referring now to Fig. 9, it will be seen that the pin 13a is affixed in the upper part 13b of the universal joint 13 which is affixed to the bottom of the fighter fuselage 12. Lever 410 is fixedly mounted upon the pin 13a by virtue of its offset portion 410a and affixed to either end of the lever 410 is a vertical link 411 or 412, each of which engages the forward end of a bell crank 413 or 414, both of the bell cranks being pivotally mounted upon the transverse shaft 415 which is fixedly mounted in the members 416 attached to the cross members 15a. The lower end of bell crank 414 is pivotally connected to the rearwardly extending link 417 which is pivotally connected to the upper end of bell crank 418 which is pivotally mounted upon the shaft 418a which is affixed in the frame 392 of the unit. (Frame 392 is shown in Fig. 1.) The rear end of bell crank 418 is pivotally connected to the link 418b, the lower end of which is pivoted to the arm 419 the forward end of which is affixed upon the left end of shaft 420 which is pivotally mounted in frame 392. Affixed upon shaft 420 is the yoke 420a carrying the collar 421 which surrounds the splines 358 and 359 and the vertical shaft 354. Collar 421 is affixed to spline 359 so that this spline moves upwardly and downwardly with collar 421 and yoke 420a, but movements of this collar do not move the spline 358.

Also, the lower end of bell crank 413 is connected to link 422, the rear end of which is attached to the upper end of arm 423 which is affixed upon the shaft 423a upon which the yoke 424 is affixed. Collar 425 surrounds splines 358 and 359 and shaft 354 and is affixed to spline 358 so that this spline moves with yoke 424 and collar 425. However, collar 425 is free to move relative to spline 359. With this arrangement it will be understood that when fuselage 12 banks to the left, the left end of lever 410 moves downwardly and the right end of this lever moves upwardly. Link 412 moves downwardly and the rearwardly extending link 417 moves to the rear, pushing ahead of it the upper end of bell crank 418. Link 418b moves downwardly as does the rear end of arm 419 which is affixed upon horizontal shaft 420. Shaft 420 rotates and the rear end of yoke 420a moves down as does the collar 421. Inasmuch as this collar is affixed to the spline 359, this spline moves downwardly carrying with it the ear 361 to which the lower end of push rod 363 is pivotally connected. Push rod 363 moves downwardly as does the ear 373 to which its upper end is connected.

At the same time that the fighter 12 is banked to the left, link 411 moves upwardly and the bottom end of bell crank 413 moves ahead causing link 422 to move in the same direction. The upper end of arm 423 similarly moves ahead rotating the shaft 423a upon which the yoke 424 is affixed. The rear end of yoke 424 moves upwardly carrying with it the collar 425 to which the spline 358 is affixed. The upward movement of spline 358 moves the ear 360 upwardly and the push rod 362 is moved in the same direction. The upper end of this push rod is connected to the ear 372 integral with the airplane simulating ring 369.

It will therefore be realized that as the fighter 12 banks to the left, push rod 363 moves downwardly and push rod 362 simultaneously moves upwardly by an equal amount. This will result in a rotation of the fighter airplane simulating ring 369 about its longitudinal axis L—L', which, as shown in Fig. 9D passes through the point F.

It will be understood without a detailed explanation that when the fighter fuselage 12 banks to the right the push rod 362 moves downwardly simultaneously with an equal upper movement of the push rod 363. The fighter simulating ring 369 therefore pivots about its longitudinal axis L—L', but in the opposite direction.

It will therefore be appreciated that the ring 369, which represents in the mechanism shown in Figs. 9, 9B, 9F and 9G the fighter 12, assumes a position about the axis L—L' and point F corresponding to the banking position of the fighter 12. It should be particularly noted that this is true regardless of the instant target relative bearing. Regardless of the position of the axis L—L' of ring 369 about the point F, the ring 369 responds in this manner to a banking of the fighter 12.

Bearing in mind that the view in Fig. 9 is from the left rear of the fighter, when the fighter 12 pitches in simulation of the diving of a plane in actual flight, the stud 13a affixed to the upper part 13b of the universal joint 13 moves upwardly as do both of the links 411 and 412. Without a detailed explanation it will be understood that when the links 411 and 421 simultaneously move upwardly, the collars 421 and 425 similarly move upwardly. Thus both of the push rods 362 and 363 move in the same direction and the fighter simulating ring 369 is rotated about the axis T—T', seen in Fig. 9D, which also passes through the point F. On the other hand when the fighter 12 is pitched in simulation of the climbing of a plane in actual flight, the two push rods 362 and 363 simultaneously move downwardly and the ring 369 is pivoted about the axis T—T' in the opposite direction.

In view of the foregoing the conclusions may be drawn:

(1) The ring 369 and its axes L—L' and T—T' is always positioned about the point F according to the assumed target relative bearing.

(2) The ring 369 is always positioned about the point F and axis L—L' according to the banking attitude of the fighter 12, L representing the nose of fighter 12.

(3) The ring 369 is always positioned about the point F and axis T—T' according to the pitching attitude of fighter 12, T representing the right side of the fighter 12.

In view of these conclusions the general statement may be made that the point F represents the intersection at all times of the longitudinal axis of the fighter represented by L—L' and the transverse axis of the fighter represented by T—T'. The axes L—L' and T—T' of ring 369 which represents the fighter are always positioned relative to point F according to the instant target relative bearing, and the plane of the axes L—L' and T—T' always assumes a position relative to point F according to the instant pitching and banking attitude of the fighter 12.

It will therefore be appreciated that if in the mechanism shown in Fig. 9 a line of sight simulating the line of sight from a fighter to an actual target is provided, and the line of sight in Fig. 9 is positioned relative to the point F in accordance with the instant assumed altitude angle, the simulated line of sight will be positioned relative to the plane established by the axes L—L' and T—T' of ring 369 exactly as the line of sight from a real fighter to an actual target is positioned relative to the plane of the fighter under corresponding conditions of relative target bearing, pitching and banking of the fighter and altitude angle.

*Means for providing a simulated line of sight and for moving this line relative to the plane established by the axes L—L' and T—T' of ring 369 in accordance with changes in the assumed altitude angle*

Target altitude angle is defined as the angle between a horizontal plane through the fighter and the line of sight from the fighter to the target. This concept is illustrated in Fig. 2B where the point F represents the position in space of the fighter plane and the line L—L' represents the direction of movement of the fighter while the point Ta represents the position in space of the target plane.

Target slant range is defined as the distance along the line of sight from the fighter to the target and in Fig. 2B is represented by the line so designated. Target ground range is the horizontal projection of the target slant range and is illustrated in Fig. 2B by the line designated target ground range.

Altitude differential is defined as the difference in altitude between the fighter and target planes, and is represented in Fig. 2B by the line so designated.

From this discussion of Fig. 2B it will be appreciated that given the factors of ground range and altitude differential, the factors of altitude angle and slant range may be readily determined. Means for introducing the factors of ground range and altitude differential into a mechanical triangulating unit from which the outputs representative of altitude angle and slant range may be obtained will now be disclosed.

Considering first the factor of ground range, reference is again made to Fig. 2 which discloses the target recorder 30 and the fighter recorder 31 together with the connecting arm 274. It has been previously explained that the position of the fighter above the earth is assumed to correspond to the position of the inking wheel 171d upon the chart 28 and that the target plane is assumed to be positioned above the surface of the earth corresponding to a point upon the chart immediately below the perpendicular axis of the sleeve 283. It has been explained that the cord 280 is connected to the plate 277 which is held by the ball 273 shown in Fig. 5B to be carried by the vertical shaft 169 of the fighter recorder 31 and that the other end of this cord 280 winds around the spring biased wheel 285 and is attached thereto. It will be appreciated that the distance upon the chart 28 between the point upon the chart 28 contacted by inking wheel 171d and the point upon the chart immediately below the vertical axis of sleeve 283 is proportional at all times to the assumed ground range. As the fighter recorder 31 moves closer to the target recorder 30 this distance decreases thus simulating a change in the assumed ground range. An increase in the assumed ground range is of course simulated by an increasing of the distance between the two recorders. When the vertical axis of sleeve 283 coincides with the vertical axis of shaft 169 and of the inking wheel the assumed ground range is zero. It should be noted that the target recorder provides a bridge under which the fighter recorder may move in all directions within the limits of the arm 274.

As the assumed ground range increases cord 280 is pulled so that the wheel 285 rotates in a clockwise direction while as the assumed ground range decreases the release of tension upon cord 280 allows the spring biased wheel 285 to turn in a counterclockwise direction.

Spring biased wheel 285 is rigidly mounted upon vertical shaft 426 which is suitably rotatably mounted in the frame 32 of the target recorder 30. (Frame 32 is shown in Fig. 1.) Vertical shaft 426 extends inside vertical sleeve 427 which carries a pair of split contact segments, an insulating disc and a pair of collector rings as shown in Fig. 5A. This assembly which is designated generally in Fig. 2 by 428 is not explained in detail because its construction, operation and use is the same as that shown in Fig. 5A. A contact roller 429 is attached to vertical shaft 426 to be moved relative to the split contact discs of assembly 428 in accordance with the rotation of wheel 285 and vertical shaft 426. Assuming that the contact roller 429 is in such a position as to contact both of the split contact segments of assembly 428, the follow-up motor 430 which is connected to the brushes 431 will not be energized. However a change in the distance between the fighter recorder 31 and the target recorder 30 will result in a rotation of wheel 285 and contact roller 429 will be moved out of engagement with one of these contact discs. Drive motor 430 is energized and its output shaft 432 by means of the worms 433 affixed thereupon will rotate the worm gears 434 mounted upon the left end of each of the two screws 435. Screws 435 will therefore be rotated and bridge member 436 will be moved to the left or to the right in Figs. 2 and 2C. The apparatus is arranged so that an increase in the distance between the target and fighter recorders 30 and 31 will cause the drive motor 430 to turn in such a direction that the bridge member 436 moves to the left while a decrease in this distance results in a movement of the bridge member in the opposite direction.

At the same time that the drive motor 430 turns the worms 433 and the gears 434 which turn the screws 435, gear 437 which is mounted upon the left end of one of the screws 434 will drive gear 438 mounted upon the left end of shaft 439. The rotation of shaft 439 results in a rotation of the worm 440 which drives the worm gear 441 attached to the sleeve 427 which carries the assembly 428 comprising the split contact segments insulating disc and collector rings. Motor 430 will therefore continue to run to change the position of bridge 436 until it has at the same time moved the assembly 428 until both of the split contact segments again contact roller 429. At this point motor 430 will stop.

Therefore means have been disclosed for moving the bridge 436 to the left in Fig. 2 a distance proportional to an increase in the distance between the target and fighter recorders 30 and 31, and to the right in Fig. 2 a distance proportional to a decrease in the distance between the two recorders. This distance is at all times proportional to the assumed ground range. The bridge 436 has a pointer 436a moving over a scale 436b graduated in miles from zero through 20. When pointer 436a is opposite zero on this scale, the assumed ground range is zero and the ball 273 is immediately below the vertical axis of sleeve 283. The bridge 436 and pointer 436a are always positioned to the left of the zero position on the scale a distance proportional to the assumed ground range, and by means of the scale and pointer the apparatus may be initially synchronized, and also, the assumed ground range determined at any instant.

Altitude differential has been defined as the difference in altitude between the fighter and target planes. When the target is higher than the fighter the altitude differential is considered positive; when lower it is considered negative.

From this definition of altitude differential, it will be realized that in order to introduce this factor the two basic factors of fighter altitude and target altitude must be combined to give the resulting altitude differential.

First, means will be described for introducing the factor of fighter altitude, then means will be disclosed for introducing the factor of target altitude, and then it will be shown how these two factors are combined in this invention to give the factor of altitude differential. Then means will be described for introducing this factor into the mechanical triangulating mechanism shown in Fig. 2.

Considering the factor of fighter altitude, reference is now made to Fig. 6 where the pitch action walking beam is designated 179. Pivotally connected to the lower end of this walking beam is the link 441 which, as well known in the art, actuates the climb valve 442 and the dive valve 443 which are connected by means of the air line 444 to the conventional altitude tank 445 which is positioned within the fighter 12 as shown in Fig. 1.

As is well known the altitude of a plane in actual flight depends upon two basic factors—first, the power setting of the plane and second, the attitude of the plane, i. e., whether the plane is climbing or diving—and, of course, the length of time that the plane has flown at its various power settings and attitudes. Referring to Fig. 6, when the throttle lever 174 is pushed to the left to simulate an increased power setting the bottom end of lever 179 moves to the rear, pulling link 441 in that direction and opening the climb valve 442. The opening of climb valve 442 connects the altitude tank 445 with the source of vacuum 228 by means of air lines 444 and 444a and the pressure within tank 445 is reduced. The reduction in the pressure within tank 445 is conveyed by means of air lines 444 and 444b to the vertical speed transmitter 447b which, as is well known in the art, is constructed like the air speed transmitter 231 and functions in much the same manner. The transmitter 447b, in response to the rate of decrease in pressure within tank 445, by means of one of the electrical cables 447a causes the simulated vertical speed indicator 448 upon the student's instrument panel to respond to the change in pressure within tank 445 to indicate the assumed rate of ascent. At the same time by means of the second cable 447a the vertical speed indicator 448a upon the instructor's panel indicates the assumed rate of ascent of the fighter 12. Thus an opening of the throttle 174 causes the simulated vertical speed indicators 448 and 448a to register just as the corresponding instruments in a real plane register in response to an opening of the throttle in the plane.

On the other hand a closing of throttle lever 174 causes the dive valve 443 to open and as a result of the opening of this valve altitude tank 445 is vented to the atmosphere through port 443a. The pressure within the tank increases and the simulated vertical speed indicators 448 and 448a indicate the assumed rate of ascent.

Assuming that the fighter 12 is pitched in simulation of the climbing of a plane in actual flight, shaft 191 rotates counter-clockwise as seen from the left in Fig. 2 and stub shaft 193 is moved to the fore. Walking beam 179 pivots about the point at which link 178 is connected thereto and the bottom end of the walking beam moves to the rear. The climb valve 442 is thereupon opened and as a result of the decrease in pressure in the altitude tank 445, the simulated vertical speed indicators 448 and 448a show a simulated rate of increase in altitude. It seems clear without additional explanation that when the fighter 12 is pitched in simulation of the diving of a plane in actual flight, the lower end of walking beam 179 moves to the fore, opening the the dive valve 443, increasing the pressure within tank 445 and again the simulated vertical speed indicators 448 and 448a register the assumed rate of loss of altitude.

The operation of the climb-dive valves in response to the movement of the simulated throttle lever and to the pitching and diving of the fighter 12 are all well known in the prior art as is the connection of these valves to the altitude tank and the operation of the simulated vertical speed indicators. It is therefore deemed unnecessary to more thoroughly explain this particular arrangement inasmuch as it forms no particular part of this invention except when combined with the other novel features of the apparatus disclosed herein. It is deemed sufficient for the purpose of understanding the factor of fighter altitude to merely know that the pressure within tank 445 varies indirectly in accordance with the assumed altitude of the fighter 12 and depends upon the successive settings of throttle lever 174 and attitudes of fuselage 12 as well as the length of time these positions are maintained. The higher the pressure within tank 445 the lower the assumed altitude.

Figure 10:
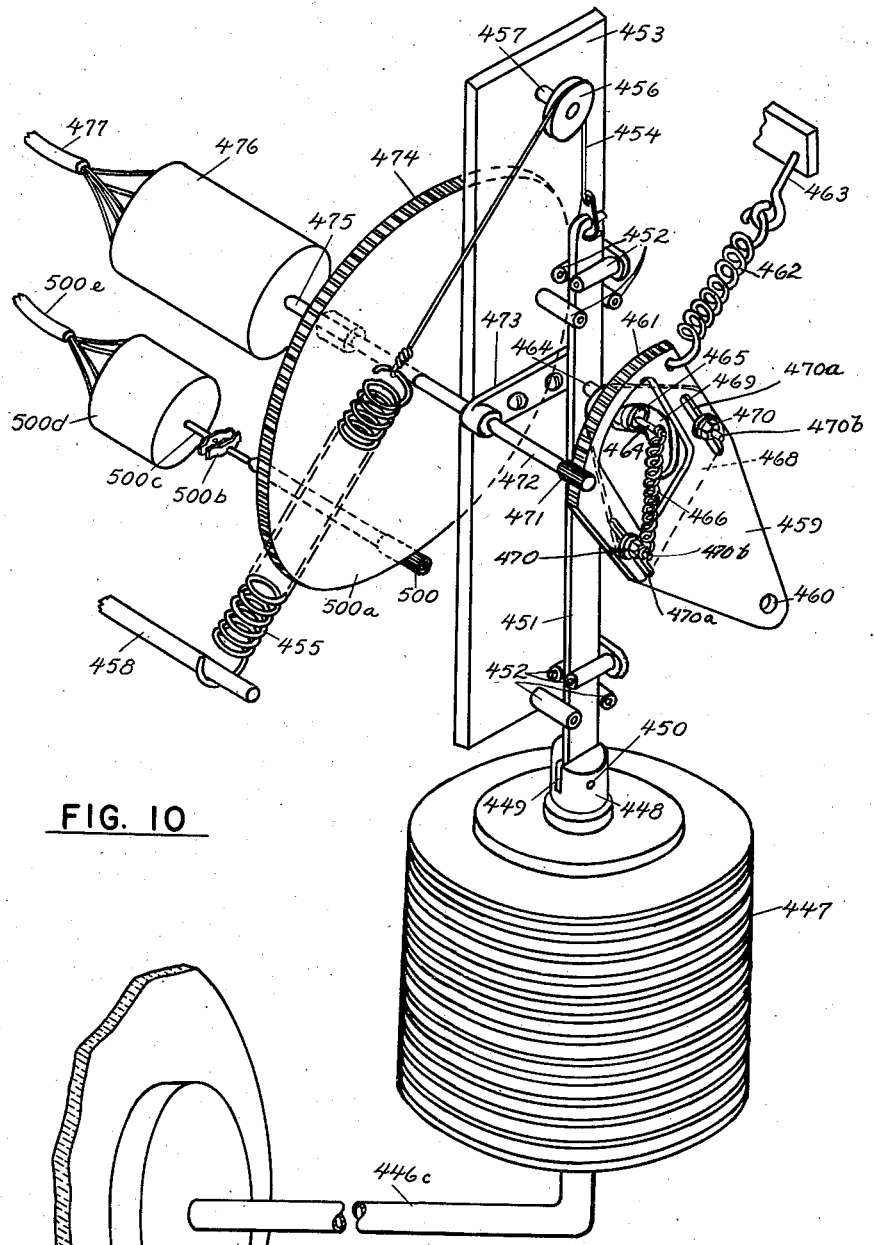
Fig. 10 is a view of the fighter altitude transmitter.

Reference is now made to Fig. 10 which is a detailed disclosure of the fighter altitude transmitting unit. In Fig. 10 the altitude tank 445 is shown to be connected by means of line 446c to the large collapsible-expansible bellows 447. Affixed to the upper end of bellows 447 is member 448 which has a slot 449 and pin 450 arranged to hold one end of reciprocating arm 451 which travels in a plurality of rollers 452 suitably attached to plate 453 which is affixed to the inside of fighter 12. To the other end of arm 451 is affixed cord 454 which travels in pulley 456 suitably held by shaft 457 which is carried by plate 453. The other end of this string is affixed to one end of tension spring 455, the other end of which is suitably attached to any fixed part 458 of the unit.

A plate 459 is pivoted at the point 460 to a suitable fixed part of the unit, and formed integrally with plate 459 is gear segment 461. A tension spring 462 is suitably attached to a corner of gear segment 461 as shown, the other end of this spring being attached to a fixed part 463 of the unit. A pin 464 is affixed to slide 451, and has mounted thereupon near its outer end roller 465, and a spring 466 has one of its ends attached to the extreme outer end of pin 464 while its other end is suitably attached to a bolt 470b. A plate 468 is suitably attached to the inside of plate 459 by means of a pair of bolt, nut and slot arrangements 470, provided to allow adjustment of plate 468. Each of these arrangements includes a slot 470a through which a bolt 470b passes, the outer end of each of the bolts being threaded for the reception of a nut 470c. Each of the bolts 470b has its inner end affixed to the plate 468. By these means, plate 468 may be adjusted relative to member 459. A cutout portion 468a is provided in member 459 to allow projection of pin 464 therethrough.

Meshing with gear segment 461 is pinion 471 formed integrally with shaft 472 held by bracket 473 attached to plate 453. Fixedly mounted upon this shaft 472 is a large spur gear 474. The input shaft 475 of the fighter altitude transmitting teletorque 476 is connected to shaft 472 for rotation therewith. Transmitter 476 is connected by means of cable 477 with fighter altitude receiver teletorque 478 shown in Fig. 11. The schematic connection of the fighter altitude transmitter 476, cable 477, and the fighter altitude receiver 478 is shown in Fig. 4.

Figure 11:
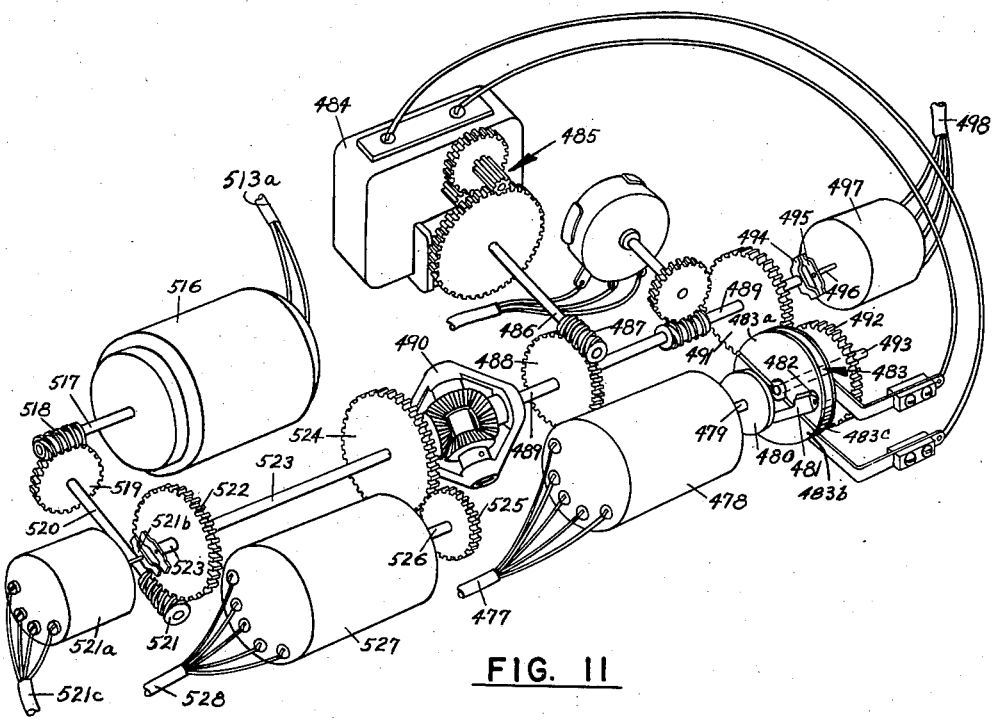
Fig. 11 shows the altitude differential unit.

Referring to Fig. 11, upon the output shaft 479 of fighter altitude receiver 478 is carried a disc 480 which has attached thereto an arm 481 carrying contact roller 482. The assembly designated generally 483 includes a pair of split contact segments 483a and 483b, an insulating disc 483c, and as shown in Fig. 11A, a pair of collector rings 483d and 483e and a pair of brushes 483f similar to those disclosed in connection with Fig. 5A. Follow-up motor 484 is connected to the brushes 483b which form a part of the assembly 483 in the manner previously disclosed. Also as previously described, when the contact roller 482 engages both of the split segments of the assembly 483 motor 484 is not energized. But when as a result of the rotation of the output shaft 479 of the fighter altitude receiver 478 roller 482 is moved out of engagement with one of the split contact segments, motor 484 is energized, the direction of turning of the motor depending upon which segment is out of contact with the roller 482. Whenever motor 484 is energized by means of gear train 485 the shaft 486 having formed integrally therewith the worm 487 is rotated and gear 488 fixedly mounted upon the input shaft 489 of the altitude differential 490 is turned. The turning of shaft 489 at the same time results in a rotation of gear 491 which is affixed upon this shaft and gear 491 drives gear 492 which is fixedly mounted upon the shaft 493 carrying the split contact segments, insulating disc, and collector rings of the assembly 483. Motor 484 therefore continues to run until it repositions the assembly 483 to the point that both of the split contact segments again are in engagement with the contact roller 482. Motor 484 is directionally controlled by the direction of rotation of the output shaft 479 of receiver 478, and the magnitude of its output depends upon the angle through which shaft 479 is turned.

Referring again to Fig. 10, a reduction in the pressure within the altitude tank 445 which, as previously explained occurs whenever there is an increase in the assumed altitude of the fighter 12, causes a collapsing of bellows 447 and slide 451 will move downwardly in Fig. 10. A movement in that direction will result in a similar movement of shaft 464 and roller 465. This roller coacting with arcuate slot 469 causes a counterclockwise pivoting of plate 459 resulting in a clockwise turning of pinion 471, gear 474 and of the input shaft 475 of the fighter altitude transmitter 476. The output shaft 479 of the fighter altitude receiver 478, shown in Fig. 11, will therefore move in the desired direction, resulting in an energization of follow-up motor 484 which will turn the output shaft 486 in the proper direction. The input shaft 489 of the altitude differential will therefore be rotated and at the same time the split gear segments of assembly 483 are properly rotated to bring both of these segments back into contact with contact roller 482, at which instant motor 484 stops.

An increase in pressure within the altitude tank 445, on the other hand, will result in an expansion of bellows 447 and by means of the just disclosed apparatus the follow-up motor 484 will be energized except in the opposite direction and the direction of movement of the input shaft 489 of differential 490 will be in the opposite direction. Similarly, the split gear segments of assembly 483 will be rotated in the opposite direction to bring both of these segments back into contact with contact roller 482.

The foregoing discloses therefore means whereby the primary input shaft 489 of the altitude differential 490 is rotated directionally and in magnitude in accordance with changes in the assumed altitude of the fighter trainer of the fighter 12.

Parenthetically, it can be here pointed out that mounted upon the right end of shaft 489, as seen in Fig. 11, is the primary member 494 of a magnetic coupling, the other member of which is 495. Member 495 is affixed upon the input shaft 496 of the fighter altitude transmitting telegon 497 which is connected by means of cable 498 to a receiver telegon (not shown) which is a part of the instructor's fighter altimeter 499. By virtue of magnetic coupling 495 shown in Fig. 11 the input shaft 496 of the fighter altitude transmitting telegon 497 rotates in accordance with the rotations of the input shaft 489 of the altitude differential. The output shaft of the receiver telegon in simulated altimeter 499 follows the movements of the input shaft 496 and therefore the altimeter 499 indicates to the instructor changes in the assumed altitude of the fighter 12. At the same time, in Fig. 10 is shown a pinion 500 formed integrally with shaft 500a which through magnetic coupling 500b turns the input shaft 500c of the telegon transmitter 500d connected by cable 500e to a telegon receiver (not shown) which is a part of the altimeter 501 in the student's instrument panel 220 in fighter 12, as seen in Fig. 1. Rotations of gear 474 in response to changes in the assumed altitude of fighter 12 thus affect the indications of simulated altimeter 501 which indicates to the student his assumed altitude.

Considering now the factor of target altitude, reference is made to Fig. 3 which is a detailed disclosure of the instructor's control desk and information panel. In Fig. 3 there is disclosed a knob 511 affixed upon the upper end of vertical shaft 512 which positions the contact (not shown) of rheostat 513. A pointer 514 is also attached to the vertical shaft 512 and arranged to move over a dial 515 which is affixed upon the top 46 of the instructor's control drawer 40. Dial 515 is calibrated in hundreds of feet per minute. Rheostat 513 is connected through cable 513a to the reversible variable speed motor 516 shown in Fig. 11 and by selectively positioning pointer 514 relative to scale 515 the instructor may determine the speed of running of motor 516. A second dial 515a, calibrated like dial 515 and having a needle positioned by knob 511 through the gear train 515b, shaft 515c, coupling 515d of the type previously described in Fig. 3, pulley 515e, belt 515f and pulley 515g, is also provided to indicate the same factor as pointer 514 and dial 515. Two indicators are provided so that the instructor may watch all of the instruments in cabinet 76, and at the same time manipulate knob 511. A switch 511a is provided, and this switch governs the direction of running of the motor. Any conventional timer of suitable type 512a is provided as is switch 513a for starting the operation of the timer. Thus the instructor may set the control knob 511 for the assumed rate of change of altitude of the target, set switch 511a to simulate a climbing or diving of the target, set the timer 512a for the length of time that he wishes the assumed change to take place. These steps having been taken, when the timer starting switch 513a is pressed the motor 516 whose speed and direction have been previously determined starts to run, and when the assumed time has elapsed, timer 512a opens the circuit controlled by switch 513a.

The diagrammatic connection between the target vertical speed control 511, rheostat 513 and motor 516 is shown in Fig. 4.

Affixed upon the output shaft 517 of motor 516 is the worm 518 which drives the worm gear 519 affixed upon shaft 520 which has upon its outer end worm 521 arranged to drive the worm gear 522 affixed upon the input shaft 523 of the altitude differential 490. Inasmuch as the direction of turning of the output shaft 517 of motor 516 is in accordance with the assumed direction of change in altitude of the target while the speed of motor 516 is proportional to the assumed rate of change of altitude of the target, and this motor runs for as long as the assumed altitude of the target is assumed to be changing, it is clear that the shaft 523 introduces into the altitude differential 490 a movement proportional to assumed changes in the altitude of the target. The differential 490 therefore combines the movements of shaft 523 and those of shaft 489—the movements of the latter shaft being in accordance with the assumed changes in the altitude of the fighter 12—so that the gear 524 affixed upon the frame of the differential 490 has a movement imparted thereto proportional to the difference between the assumed altitude of the fighter and the assumed altitude of the target. Thus the gear 524 is always positioned in accordance with the assumed altitude difference. This same motion is transmitted to the gear 525 which is mounted upon the input shaft 526 of the altitude difference transmitter 527 which is connected by means of cable 528 to the altitude difference receiving teletorque 529 shown in the upper right portion of Fig. 2 to be carried by the target recorder 30.

Again referring to Fig. 4, the schematic connection of the altitude difference transmitter 527, cable 528 and the altitude difference receiver 529 are there schematically shown.

(Telegon transmitter 521a, by virtue of the permanent magnet type magnetic coupling 521b through cable 521c and a receiver telegon causes target altimeter 522c shown in Figs. 1 and 3 to indicate to the instructor at all times the assumed target altitude.) The magnetic coupling is used for ease in installation.

Referring again to Fig. 2, the output shaft 530 of the altitude difference receiver 529 carries a contact roller which moves with respect to a pair of split contact segments forming a part of the assembly designated generally by 531. This assembly 531 comprises in addition to the split contact segments an insulating disc, a pair of collector rings and a pair of brushes like those disclosed in connection with Fig. 5A. The contact brushes of assembly 531 are connected to the follow-up motor 532 by conductors 532a as previously explained in connection with Fig. 5A so that the motor 532 is not energized when the contact roller contacts both of the gear segments but when the roller engages only one of these segments motor 532 is energized, the direction of rotation of the output shaft 533 of the motor depending upon which one of the contact segments the roller engages. Affixed upon the end of the output shaft 533 of motor 532 is the worm 534 which drives the worm gear 535 which in turn drives the spur gear 536 by means of an intermediary shaft. Gear 536 meshes with gear 537 to drive the same and as gear 537 is rotated the assembly 531 is turned until it reaches such a point that the contact roller controlled by altitude difference teletorque receiver 529 again contacts both of the split segments of this assembly. Simultaneously gear 537 drives shaft 538 upon the left end of which is gear 539 driving gear 540 which through the intermediary shaft drives gear 541 which in turn drives the gear 542 affixed upon the right end of the splined shaft 543. Splined shaft 543 is suitably mounted for rotation by any suitable means attached to the frame 32 shown in Fig. 1 of the target recorder 30.

As also seen in Fig. 2 the splined shaft 543 passes through the enlarged center portion of bridge 436 and within this enlarged center portion is placed a splined rotatable bearing thus allowing the splined shaft to rotate within the enlarged portion as well as permitting movement of the bridge 436 axially of the splined shaft 543.

Referring now to Fig. 2C which shows a part of the detailed construction of the bridge 436, and a part of the mechanical triangulating unit, it will be seen that this bridge comprises a trackway 544 in which the toothed slide 545 is free to move. Inasmuch as slide 545 is engaged by splined shaft 543 it will be appreciated that the position of slide 545 in trackway 544 depends upon the rotation of the splined shaft. Affixed to the lower side of slide 545 is the depending member 546 upon the lower end of which is pivotally mounted another slide 548. This second slide is arranged to move in the trackway 549 of the slant range arm 550 shown in full in Fig. 2.

A cord 560 is provided, this cord running in the groove 549 as shown and having its left end anchored in the slide 548 at a point coincident with the vertical axis of depending member 546. This arrangement may be much like that shown in Fig. 5B. The right end of cord 560 passes over, around and under pulley 560a and back over pulley 560b and then downwardly along the axis of sleeve 552. Two pulleys are used in order that slide 548 may pass over the axis of tube 552 without interference from pulley 560b which otherwise would have to be in a higher position. As best seen in Fig. 2, this cord is wound around and anchored upon the spring biased pulley 561 fixedly mounted upon the input shaft of the slant range transmitting teletorque 562. The right end of the slant range arm 550 is rigidly affixed to gear 551 which is fixedly mounted upon the upper end of sleeve 52 which is suitably rotatably mounted in any part of the frame of the target recorder 30. Meshing with gear 551 is the pinion 553 which is fixedly mounted upon the input shaft 553a of the altitude angle transmitting teletorque 554.

In the operation of the mechanical triangulating mechanism shown in Figs. 2 and 2C, when the bridge 436 positions the depending member 546 shown in Fig. 2C so that member 546 is intercepted by a vertical plane through the center of gear 551 and perpendicular to the splined shaft 543, the ground range is assumed to be zero. When the depending member 546 is intercepted by a vertical plane through the center of gear 551 and parallel to the splined shaft 543, the altitude difference is assumed to be zero. Thus when the depending member 546 is immediately above the center of gear 551, the ground range as well as the altitude difference are both assumed to be zero.

Bearing these basic assumptions in mind, as the distance between the fighter and target recorders 30 and 31 increases, by means of the arrangement previously described the bridge 436 will be moved to the left away from a vertical plane through the center of gear 551 and perpendicular to splined shaft 543, and the movement of the bridge will be proportional to the increase in distance between the recorders. Slide 548 will therefore be moved along the slant range arm 550 in track 549 a corresponding distance. As slide 548 so moves, cord 560 is pulled thereby turning the pulley 561 upon the spring biased input shaft of slant range transmitter 562. On the other hand, should the distance between the fighter and target recorders decrease, thus indicating a decrease in the assumed ground range, drive motor 430 will be energized to turn in the opposite direction and bridge 436 will move toward a vertical plane through the center of gear 551 and perpendicular to splined shaft 543, moving therewith slide 548 and depending member 546. The release of tension upon cord 560 will cause the spring biased input shaft of slant range transmitting teletorque 562 to turn in the opposite direction.

It should be noted that the depending member 546 is at all times positioned to the left of a vertical plane through the center of gear 551 and perpendicular to splined shaft 543 a distance proportional to the distance between the fighter and target recorders. This distance between the recorders in turn is at all times proportional to the assumed ground range.

Assuming that the axis of depending member 546 is cut by a vertical plane through the center of gear 551 and parallel to the splined shaft 543, as the output gear 524 of the altitude differential 490 shown in Fig. 11 is rotated, by means of altitude difference transmitter 527 the output shaft of altitude difference receiver 529 seen in Fig. 2 is rotated energizing the follow-up motor 532. This motor through the means previously disclosed will rotate the splined shaft 543 in a direction and through an angular amount equivalent to the assumed change in altitude difference. Thus the toothed slide 545 is moved in trackway 544 a distance equal to the assumed change in altitude difference. If the assumed altitude difference is positive—that is the target plane is assumed to be higher than the fighter plane—splined shaft 543 turns so that the toothed slide 545 and the depending member 546 move upwardly as viewed in Fig. 2. In the presence of a positive assumed altitude difference, as the assumed altitude difference decreases splined shaft 543 is rotated so that the slide 545 and depending member 546 move downwardly as viewed in Fig. 2. On the other hand, starting with a zero altitude difference, if a negative altitude difference is introduced—that is the target plane is assumed to be lower in altitude than the fighter plane—splined shaft 543 moves in such a direction as to cause the toothed slide 545 and depending member 546 to move downwardly in Fig. 2. In the presence of a negative altitude difference as the altitude difference approaches zero, splined shaft 543 is rotated in such a direction as to cause the toothed slide 545 and depending member 546 to move upwardly as seen in Fig. 2.

It will be appreciated that the depending member 546 is always positioned relative to a vertical plane through the center of gear 551 and parallel to splined shaft 543 according to the instant assumed altitude difference. When the altitude difference is positive, member 546 is above that plane, as seen in Fig. 2C, a distance proportional to the assumed altitude difference, and when the altitude difference is assumed to be negative, member 546 is below that plane a proportional difference.

Bearing in mind the fact that the depending member 546 is at all times positioned a distance to the left of a vertical plane through the center of gear 551 and perpendicular to splined shaft 543 in accordance with the assumed ground range, and that this same depending member 546 is always positioned from a vertical plane through the center of gear 551 and parallel to splined shaft 543 a distance proportional to the assumed difference in altitude, in view of the theoretical discussion concerning Fig. 2B it will be appreciated that the distance from the vertical axis of depending member 546 to the center of gear 551 is at all times proportional to the assumed slant range and that the angle between arm 550 and a vertical plane through the center of gear 551 and parallel to splined shaft 543 is at all times equal to the assumed altitude angle. As changes in the assumed slant range occur the input shaft of the slant range transmitter 562 is rotated accordingly so that the position of this shaft is always in accordance with the instant assumed slant range. The slant receiving teletorque which is connected to the slant range transmitting teletorque 562 will be later described as well as its function.

As the altitude angle represented by the angular position of the arm 550 changes, the angular position of gear 551 changes by an equal amount and this angular rotation is imparted to the gear 553 upon the input shaft of the altitude angle transmitting teletorque 554. The altitude angle transmitter 554 is connected by means of the cable 570 to the altitude angle receiver 571 shown in Fig. 9. (The schematic connection of the altitude angle transmitter 554, cable 570 and the altitude angle receiver 571 is also shown in Fig. 4.) Consequently the output shaft 572 of the altitude angle receiver 571 is responsive to changes in the altitude angle. Fixedly mounted upon the output shaft 572 of the altitude angle receiver 571 is the pinion 573 which drives the spur gear 574 freely mounted upon shaft 575. Affixed to gear 574 to be rotated therewith relative to the assembly 576 is the contact roller 577. Assembly 576 comprises a pair of split contact segments (not shown) carried by the gear 578 which also serves as an insulating disc, a pair of collector rings (not shown) and a pair of collector brushes 578a which are connected by means of the conductors 579 to the follow-up drive motor 580. This arrangement is similar to the corresponding parts described in connection with Fig. 5A. The output shaft of the reversible drive motor 580 is numbered 581 and upon its left end is the pinion 582 which drives the gear 578, split contact segments and collector rings of the assembly 576. Assembly 576 including gear 578 is fixedly mounted upon shaft 575, the extreme ends of which are rotatably mounted in the fixed frame 32 (shown in Fig. 1) of the attitude correction unit shown in Fig. 9. Fixedly mounted upon each end of the shaft 575 is an arm 583 each of which has affixed to its forward end a stud 584, each of these studs engaging a sleeve 585. Each of the sleeves 585 is free to slide upon a vertical link 586. A stop member 587 is fixed upon the lower end of each of the vertical links 586 and encircling each of the vertical links 586 and abutting against each of the stop members 587 is a compression spring 588. The upper end of each of the compression springs 588 abuts against the lower end of one of the sleeves 585. At the same time fixedly mounted upon each of the vertical links 586 at a point above the associated sleeve 585 is a second stop member 589 and a second compression spring 590 encircles each of the vertical links 586 and bears against its associated stop 589 and sleeve 585. These arrangements of springs and sleeves, it will be understood, provide positive type centering devices.

Figure 9F:
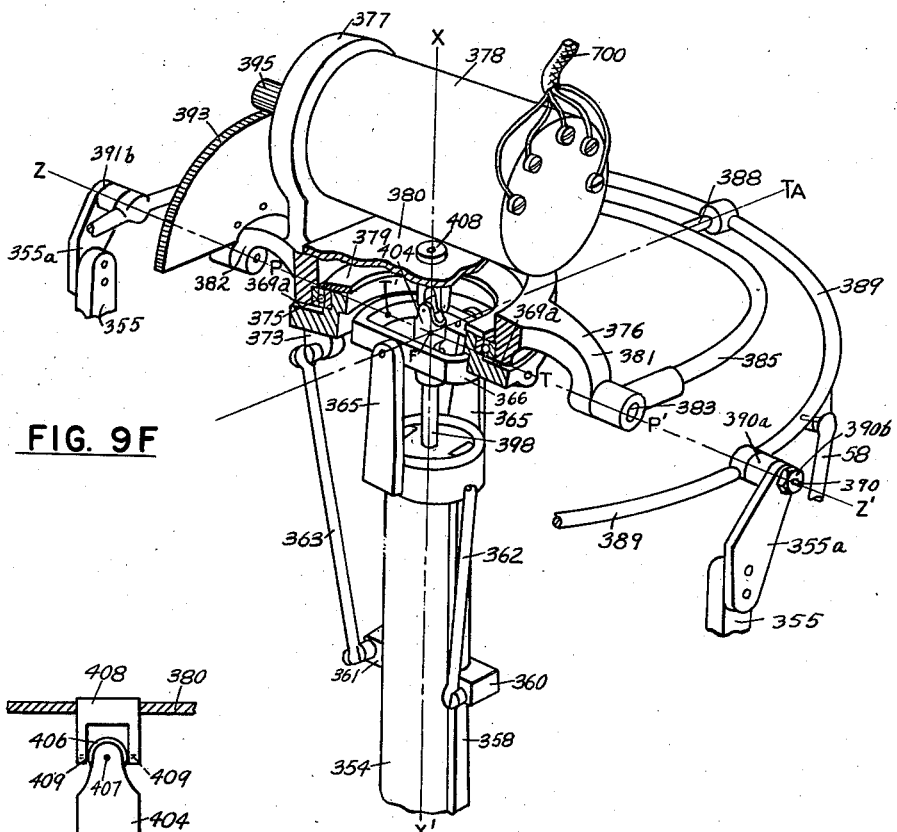

Fixedly attached to the upper end of each of the vertical links 586 is a stud 591 and the inner ends of each of the studs is pivotally attached to the outer gimbal ring 389 which is free to pivot about the axes of the pins 390 and 391 carried by the members 355a, the axes of these pins being represented in Figs. 9B, 9F and 9G by the axis Z—Z. Pins 390 and 391 pass through the spacers 390a and 391a, and are held by nuts 390b and 391b.

In view of the just described construction it will be appreciated that when contact roller 577 carried by gear 574 is in engagement with both of the contact segments which form a part of the assembly 576, drive motor 580 will not be energized. However, assuming that the mechanical triangulating means shown in Fig. 2 is actuated as a result of a change in the assumed altitude angle, the output shaft 572 of the altitude angle receiver 571 is rotated. Contact roller 577 moves out of engagement with one of the split contact segments of assembly 576 and follow-up motor 580 is energized, the direction of rotation of the output shaft 581 of this follow-up motor depending upon whether the mechanical triangulating means is moved to indicate an increase or a decrease in the assumed altitude angle. The energization of follow-up motor 580 through pinion 582 and gear 578 results in a rotation of shaft 575 and the forward ends of arms 583 are moved upwardly or downwardly. As the forward ends of the arms 583 move upwardly or downwardly, under the control of later described factors, the links 586 move accordingly and the forward half of te gimbal 389 moves in the same direction as do the links 586, gimbal 389 pivoting about the axis Z—Z which passes through F.

At the same time that the rotation of gear 578 pivots the gimbal 389 about the axis Z—Z, this gear also moves the assembly 576 relative to the contact roller 577 so that motor 580 continues to rotate gimbal 389 until the split contact segments of assembly 576 again are both in contact with roller 577. At this instant, motor 580 stops.

It will be seen that ring 369 has integral therewith the ring 374 and ball bearing 375 is placed therearound. Member 376 is held by ball bearing 375 and integral with this casting is ring 377 holding the housing of the elevation angle transmitting teletorque 378. A cap 380 is placed on the top of casting 376 and a pair of extensions 381 and 382 are integral with casting 376. The gimbal ring 385 is pivotally connected to the extensions 381 and 382 by means of pins 386 and 387. The longitudinal axes of these two pins form the axis P—P which at all times passes through the point F which is the intersection of the axes L—L' and T—T' of the fighter simulating ring 369. Integral with gimbal 385 is the stud 388 which in the apparatus of these figures represents the target plane. Stud 388 is rotatably held by outer gimbal 389. The longitudinal axis of stud 388 at all times intersects the point F, and therefore the line F—Ta is at all times the simulated line of sight from the fighter to the target. Inasmuch as the gimbal 389 moves about the axis Z—Z only, it will be appreciated that the line of sight F—Ta always moves in a vertical plane perpendicular to the axis Z—Z, the line of sight F—Ta intersecting axis Z—Z at F.

Further, the axis P—P is at all times perpendicular to the line of sight F—Ta, but it is coincident with axis Z—Z only under the conditions of "straight and level flight" of the fighter 12 because the casting 376 which holds the pins 386 and 387 which determine the axis P—P always assumes the same attitude about point F assumed by ring 369.

As the altitude angle changes, the line of sight F—Ta is rotated in a vertical plane about the point F which is intersected by axis Z—Z. The rotation of the line of sight is also relative to the plane of the axes L—L' and T—T'. When the mechanical triangulating means shown in Fig. 2 is positioned to indicate a zero altitude angle, line of sight axis F—Ta lies in a horizontal plane. For a positive altitude angle of a given number of degrees, the line of sight F—Ta always makes an angle with a horizontal plane through F and axis Z—Z equal to the assumed altitude angle, the Ta end of the axis being raised above the reference plane. On the other hand, for a negative altitude angle of a given number of degrees, the line of sight axis F—Ta always makes an angle with a horizontal plane through point F and axis Z—Z equal to the assumed altitude angle except that the Ta end of the axis is below the reference plane.

It will therefore be realized that in the apparatus shown in Figs. 9, 9F and 9G the line of sight F—Ta moves relative to the plane through the longitudinal axis L—L' and transverse axis T—T' of ring 369 in accordance with the assumed altitude angle, and the plane of axes L—L' and T—T' moves relative to the line of sight F—Ta in accordance with target relative bearing and pitching and banking of the fighter 12.

*Means for measuring the assumed azimuth angle and assumed elevation angle*

In view of the foregoing disclosure it will be appreciated that:

1. The axis L—L' of the fighter simulating ring 369 is always positioned relative to the point F and line of sight axis F—Ta in accordance with the assumed target relative bearing.

2. The ring 369 is always positioned about its axes L—L' and T—T' and relative to the point F and line of sight F—Ta according to the pitching and banking position of the fighter 12.

3. The line of sight F—Ta is always positioned relative to the point F in accordance with the assumed altitude angle.

Therefore, the line of sight F—Ta is positioned relative to the axis L—L' and the plane formed by axes L—L' and T—T' in accordance with the assumed factors of latitude and longitude of the fighter and target planes, heading of the fighter 12, assumed altitude differential, and pitching and banking position of the fighter 12, exactly in accordance with the way a real line of sight would be positioned relative to the longitudinal axis of an airplane and the plane formed by the longitudinal and lateral axes of the plane under conditions corresponding to the assumed factors.

Target azimuth angle has been defined as the angle between the fighter's longitudinal axis and the projection of the line of sight from the fighter to the target on the plane through the lateral and longitudinal axes of the fighter. Thus, in Fig. 9G the assumed target azimuth angle is the angle between axis L—L' and the projection of F—Ta on the plane established by axes L—L' and T—T'.

Target elevation angle has been defined as the angle between the line of sight from the fighter to the target and the plane through the longitudinal and lateral axes of the fighter. Thus in Figs. 9F and 9G the assumed elevation angle is the angle between line F—Ta and the plane established by the axes L—L' and T—T'. Means for measuring these angles will now be disclosed.

Referring again to Figs. 9, 9B, 9F and 9G a gear sector 393 is affixed by means of screws 394 to the inner gimbal ring 384 and meshing the gear sector 393 is the pinion 395 rigidly affixed upon the input shaft 396 of the elevation angle transmitting teletorque. It should be noted that relative motion between the gimbal ring 385, to which the gear sector 393 is attached, and the casting 376, to which the transmitter 378 is attached, about the axis P—P produces a proportional rotation between the input shaft 396 and housing of transmitter 378.

Also as shown in Fig. 9 is the gear 397 which is affixed upon the lower end of vertical shaft 398. Driven by gear 397 is the pinion 399 which is affixed upon the input shaft 400 of the azimuth transmitter 322 which has been previously mentioned.

Figures 9C, 9E:
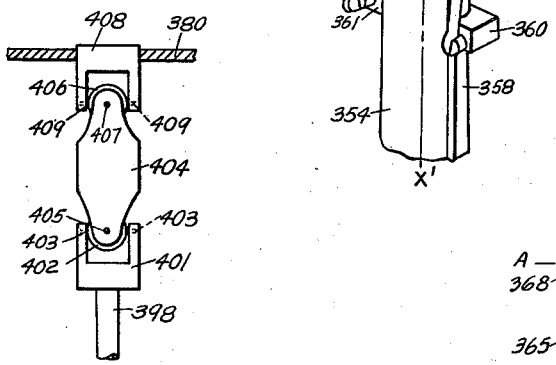
Figure 9A:
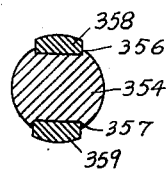

Vertical shaft 398 extends inside and axially of the vertical shaft 354 for the entire length of this latter shaft, and as best seen in Fig. 9E upon the upper end of vertical shaft 398 is affixed the yoke 401. The yoke 401 carries the ring 402 which is pivotally mounted with respect thereto by means of the pins 403. Connecting member 404 is pivotally attached to the ring 402 by the pins 405, only one of which is shown.

Therefore, connecting member 404 is arranged for universal movement with respect to the yoke 401. The upper end of the connecting member 404 is pivotally mounted with respect to the ring 406 by means of pivots 407, only one of which is shown, and the ring 406 is pivotally mounted with respect to the yoke member 408 by means of pivots 409. Thus, the connecting member 404 is also universally attached to plate yoke 408. Upper yoke 408 is affixed to plate 380 also shown in Fig. 9B for movement therewith. It will therefore be appreciated that any rotational movements of casting 376 will be transmitted to the input shaft of transmitter 322.

Target azimuth angle has been defined as the angle between the fighter's longitudinal axis and the projection of the line of sight from the fighter to the target on the plane through the lateral and longitudinal axes of the fighter.

Target elevation angle has been defined as the angle between the line of sight from the fighter to the target and the plane through the longitudinal and lateral axes of the fighter.

Referring to Fig. 9H, T—T' represents the transverse axis of the fighter 12, L—L' represents the longitudinal axis of the fighter, which axes intersect at F, and these two axes define the plane 369. Banking of the fighter causes a rotation of plane 369 about axis L—L', while pitching of the fighter causes a rotation of plane 369 about axis T—T'. Turning of the fighter causes a rotation of axes L—L' and T—T' in the plane 369 about the point F. The line of sight from the fighter to the target is represented by the line F—Ta. Line P—P is in plane 369 through point F and perpendicular to the line of sight F—Ta which ordinarily is not in plane 369. For convenience line F—Ta' is drawn in plane 369 through point F and perpendicular to line P—P. Therefore F—Ta' is the projection upon plane 369 of the line of sight F—Ta. The angle between F—Ta and F—Ta' is elevation angle, and the angle between F—Ta' and L—L' is the azimuth angle.

Referring to Fig. 9G the axis P—P always lies in the plane of the ring 369 and passes through the point F. Inner gimbal ring 385 always maintains this axis P—P perpendicular to the line of sight F—Ta. Therefore F—Ta' in the plane of ring 369 and perpendicular to P—P is always the projection of the line of sight F—Ta to the plane of ring 369.

Therefore, in Fig. 9G the angle formed by the line of sight F—Ta and the line F—Ta' is the assumed elevation angle of the target and varies in accordance with the instant combination of pitching and banking of the fighter 12, target relative bearing and target altitude angle, exactly as in the case of a plane and target plane in actual flight.

The assumed elevation angle is measured by teletorque 378 which as previously explained is affixed upon casting 376 so that it always assumes the attitude of the plane of ring 369 about axis P—P, with which plane the projection F—Ta' moves. Gear segment 393 which is affixed to the inner gimbal 385 always assumes the attitude of the line of sight F—Ta about the axis P—P. Consequently, as the angle between F—Ta and F—Ta' changes, which angle is the assumed elevation angle, the teletorque 378 and gear segment 393 have a proportional relative motion so that the gear 395 upon the input shaft of the elevation angle transmitter 378 turns the input shaft relative to the housing accordingly. Thus, the input shaft of this transmitter is always positioned in accordance with the assumed target elevation angle.

Furthermore, in Fig. 9G the angle between L—L' in the plane of ring 369 and F—Ta' also in the same plane is the assumed azimuth angle of the target and varies in accordance with pitching and banking of the fighter and in accordance with target relative bearing and altitude angle of the target exactly as in the case of a real plane and target in actual flight.

The assumed azimuth angle is measured by azimuth transmitter 322 seen in Fig. 9. As previously explained the housing 321 of this teletorque is geared through gears 320 and 319, shaft 318 and gears 351, 352 and 353 to the splined shaft 354 which moves with the axis L—L' of ring 369. Therefore the housing 321 is moved according to movements of the axis L—L'. The input shaft 400 of transmitter 322 is connected by gears 399 and 397, shaft 398, and the apparatus shown in Fig. 9E to plate 380 which moves in accordance with F—Ta'. (Plate 380 must move with F—Ta' because F—Ta' is at all times perpendicular to P—P and plate 380 moves with P—P.) Consequently the input shaft is moved according to movements of F—Ta'. Therefore the relative movements between the input shaft 400 and the housing 321 of azimuth transmitter 322 are proportional to the relative movement between axis L—L' and line F—Ta'. Therefore, the position of the input shaft 400 relative to housing 321 is at all times in accordance with the assumed azimuth angle.

It has been shown that the input shaft of the slant range transmitter 562 shown in Fig. 2 moves in accordance with changes in the assumed slant range.

The conclusions may then be made:

(1) The input shaft of the slant range transmitter 562 moves relative to its housing in accordance with changes in the assumed slant range;

(2) The input shaft of the elevation angle transmitter 378 moves relative to its housing in accordance with changes in the assumed elevation angle;

(3) The input shaft of the azimuth transmitter 322 moves relative to its housing in accordance with changes in the assumed azimuth.

In view of these conclusions it will be appreciated that if means are provided responsive to the slant range transmitter for causing the range indicator to register in accordance with the movements of the input shaft of the slant range transmitter 562, the proper assumed range will be indicated to the student in the fighter 12. Correspondingly, the relative movements between the elevation angle transmitter housing and its input shaft may be used to position the image upon the screen according to assumed elevation angle, to indicate to the student the assumed elevation angle, and the same movements of the azimuth transmitter 322 may be used to position the image to indicate to the student the assumed azimuth. Also means operated by the slant range transmitter, elevation angle transmitter and azimuth transmitter may be used to indicate to the instructor the assumed slant range, elevation angle and assumed azimuth. Such means will now be described.

*Means for indicating to the student and to the instructor the assumed slant range, assumed elevation angle and assumed azimuth*

Figure 12:
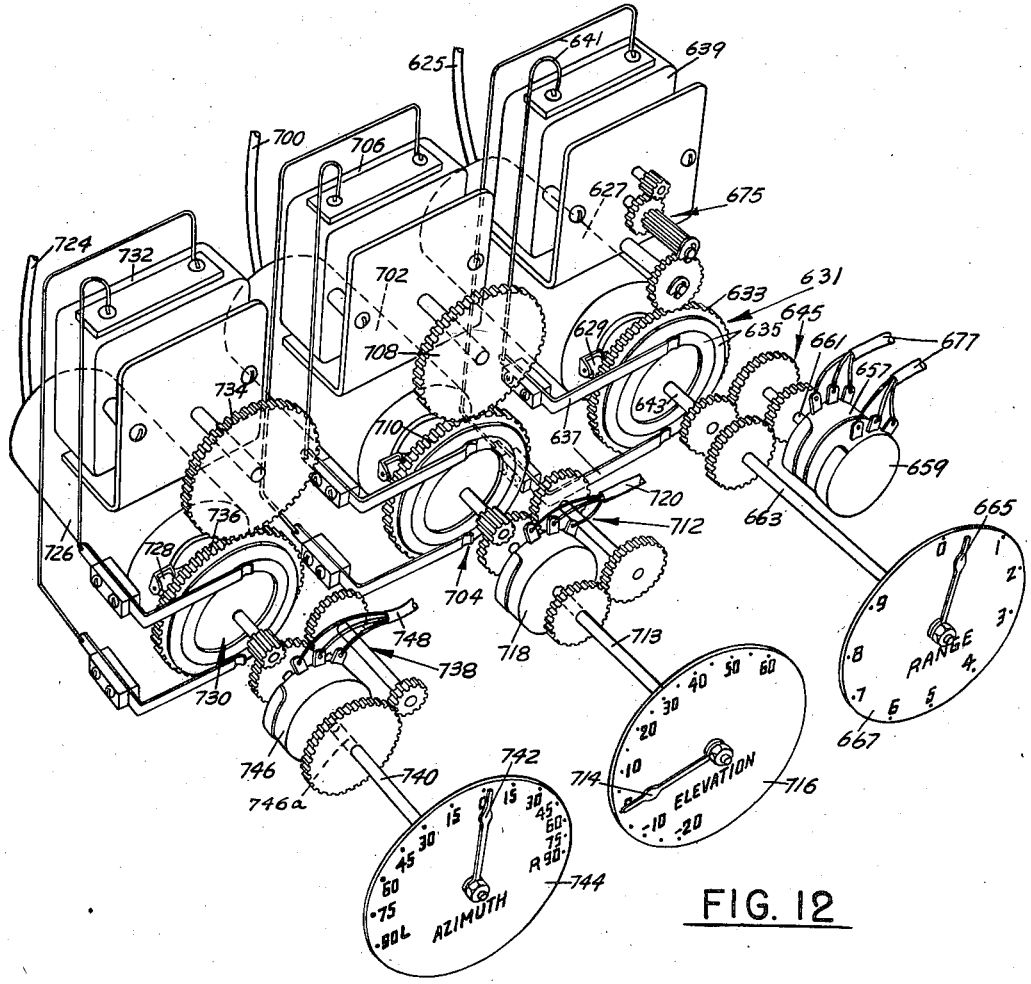
Fig. 12 is a drawing of the potentiometer drive units.

Reference is made to Fig. 2 where the slant range transmitter 562 is shown to be connected by means of the cable 625 to the slant range receiving teletorque 627 shown in Fig. 12 which is a detailed disclosure of the potentiometer drive unit. The output shaft (not shown) of the slant range receiver 627 carries the roller 629 which engages one or both of a pair of contact segments (not shown) of the contact assembly designated generally in Fig. 12 by 631. The contact assembly 631 comprises, in addition to the pair of split contact segments, the gear 633 and a pair of contact rings 635 which are engaged by the brushes 637 connected to the follow-up drive motor 639 by means of the conductors 641. The assembly 631 is affixed upon the shaft 643 driving the reduction gear train designated generally 645. Two potentiometers 657 and 659 are provided and it will be seen that the shaft 661 driven by the gears 645 moves the rotor of both of the potentiometers.

At the same time, the gear train 645 drives the shaft 663 upon the end of which is mounted the needle 665 which moves over the dial 667 graduated in miles as shown.

By virtue of the just explained arrangement it will be appreciated that when the contact roller 629 engages both of the split gear segments of the assembly 631, drive motor 639 is not energized. However when the mechanical triangulating mechanism shown in Fig. 2 is operated to produce a change in the assumed slant range, the input shaft of the slant range transmitter 562 is turned in a direction according to whether the slant range is increased or decreased, the magnitude of the turning depending upon the magnitude of the change in assumed slant range and the direction being dependent upon whether it is an assumed increase or decrease. The output shaft of the slant range receiver 627 responds accordingly and the contact roller 629 moves out of engagement with one of the split contact segments of the assembly 631. The direction of energization of the follow-up motor 639, as well as the duration of its running, responds in accordance, and by means of the gear train designated generally 645 the shaft 643 is rotated. Motor 639 continues to run in the correct direction until the assembly 631 affixed upon shaft 643 is rotated until both of the split contact segments again come into engagement with contact roller 629. The direction of rotation of the shaft 643 and the movement of needle 665 is therefore dependent upon whether the assumed slant range increases and decreases and the magnitude of the rotation of shaft 663 and needle 665 depends upon the magnitude of the assumed change. Thus needle 665 is properly moved with respect to dial 667 in accordance with the changes in the assumed slant range so that the needle 665 and dial 667 always indicate the assumed slant range.

As seen in Figs. 1 and 3, the needle 665 and dial 667 form a part of the instructor's information panel so that the instructor by reference thereto may ascertain at any time the assumed slant range.

At the same time as the needle 665 is moved with respect to dial 667 to indicate to the instructor the instant assumed slant range, referring to Fig. 12 it will be appreciated that the shaft 661 which moves the rotors of the potentiometers 657 and 659 is similarly moved in accordance with changes in the assumed slant range. Thus the potentiometers 657 and 659, having their rotors so positioned, may be used to establish an electrical value in direct linear proportion to the assumed slant range as determined by the mechanical triangulating mechanism shown in Fig. 2. The potentiometer 657 and the potentiometer 659 are connected by means of cable 677 to the Sanborn echo simulator shown in Fig. 4 to be designated 683. This echo simulator being known to the prior art forms no part of my invention except when combined with the parts of this invention. The echo simulator is standard United States Army equipment and is designated by the Army Serial Number RC225-T3. The Sanborn equipment in response to the electrical value fed thereinto by the slant range potentiometer 657 generates a signal in accordance with the potentiometer determined electrical value and feeds this signal by the electrical connection 685 into the intermediate frequency stage of the real radar signal equipment 687. This radar signal equipment is also standard United States Army equipment and is designated by the Army Serial Number SCR-720-A. Being known to the prior art, in and of itself it forms no part of my invention. This signal fed into the radar signal equipment by the echo simulator is the same signal that would be fed into the radar equipment carried by a plane in actual flight if the slant range of a real target were the same as that represented by the mechanical triangular means shown in Fig. 2.

It will be seen that the radar signal equipment 687 comprises a unit 689 shown in Fig. 1 to be located outside the fighter 12. This unit 689 rests upon table 689a is the radar operator's information panel and control unit and comprises a screen 17a which gives to the radar operator the same information that the screen 17 in Figs. 1 and 1A gives to the student pilot. The unit 689 also comprises a second screen 691 forming a part of the range scope. The radar signal equipment 687 vertically positions an image upon screen 691 in accordance with the signal from the Sanborn echo simulator 683. By means of control knob 693 the radar operator positions a sweep line relative to the image appearing upon the screen 691. The positioning of the knob 693 at the same time causes the needle 695 of the range meter 19 shown in Fig. 1A to move over the dial 697 so that the assumed slant range is indicated by the range meter 19 to the student in the fighter 12.

The range meter 19 has two dials, one graduated in terms of miles from zero through ten and the inner graduated from zero through 15,000 feet. The radar operator has under his control a suitable control mechanism whereby he can select the proper dial according to the magnitude of the assumed slant range, and at the same time signal to the student the dial to be used.

Referring again to Fig. 9 it has been explained that the input shaft of the elevation angle transmitter 378 moves relative to the housing of this transmitter in accordance with changes in the assumed elevation angle. By means of cable 700 which connects the elevation angle transmitter with the elevation angle receiver 702 shown in Fig. 12, the output shaft of the elevation angle receiver is moved in accordance with changes in the assumed elevation angle. By means of the contact assembly 704, the drive motor 706 controlled thereby, the gears 708, 710 and the gear train 712 and shaft 713, the needle 714 is moved relative to the dial 716 in accordance with changes in the assumed elevation angle. At the same time the rotor of the potentiometer 718 is moved in accordance with changes in the assumed elevation angle. Inasmuch as this system is substantially identical with the system shown in the right part of Fig. 12, it is deemed unnecessary to explain it in greater detail. The assumed elevation angle dial 716 is graduated from minus 20 to plus 60 as shown in Fig. 12 and the dial 716 and pointer 714 are located as shown in Figs. 1 and 3 so that by reference thereto the instructor may ascertain the assumed elevation angle.

The potentiometer 718 establishes an electrical value in direct linear proportion to the assumed elevation angle of the target as determined by the mechanism shown in Fig. 9. The potentiometer then feeds this established electrical value by means of the wires contained in cable 720 to the echo simulator 683 shown in Fig. 4. The echo simulator in response to the electrical value fed thereinto by potentiometer 718 generates a signal accordingly and feeds this signal by means of electrical connection 685 to the intermediate frequency stage of the radar signal equipment 687. This signal fed into the radar equipment is the same signal that would be fed into the intermediate frequency stage of the radar equipment carried by a plane in actual flight if the real elevation angle were the same as that produced by the mechanism shown in Fig. 9. The radar equipment vertically positions the image on the student's C-scope 17 as well as on the radar operator's C-scope 17a to indicate the assumed elevation angle.

Referring again to Fig. 9 it has been explained that the relative motion between the input shaft 400 and the housing 321 of the azimuth transmitter 322 is always in accordance with assumed changes in the azimuth angle. By means of brushes 723a and cable 724 the azimuth transmitter 322 is connected to the azimuth receiver 726 shown in Fig. 12. By means of the contact roller 728, contact assembly 730, follow-up drive motor 732, gears 734 and 736, gear train 738, and shaft 740, the pointer 742 mounted upon shaft 740 is moved relative to the dial 744 in accordance with changes in the assumed azimuth angle. Dial 744 is graduated from 90L through zero to 90R as shown. Inasmuch as this system for positioning the needle 742 is identical with that shown in Fig. 12 for positioning the needle 714, a further explanation is deemed unnecessary.

A reference to Figs. 1 and 3 will show that the instructor may, by reference to the needle 742 and dial 744, ascertain the instant assumed azimuth angle.

Referring again to Fig. 12, at the same time that the needle 742 is moved to indicate a change in the assumed azimuth angle, the rotor 746a of the potentiometer 746 is accordingly positioned to establish an electrical value in direct linear proportion to the assumed azimuth angle as determined by the mechanism shown in Fig. 9. By means of cable 748 this electrical value is fed into the echo simulator equipment 683 shown in Fig. 4. The echo simulator equipment in response to the electrical value fed thereinto generates a signal in accordance with the potentiometer determined electrical value and feeds this signal by means of connection 685 into the intermediate frequency stage of the radar signal equipment 687. This signal fed into the radar equipment by the echo simulator is the same signal that would be fed into the intermediate frequency stage of radar equipment carried by a plane in actual flight if the azimuth of a real target were the same as that determined by the mechanism shown in Fig. 9. The radar equipment horizontally positions the image on the student's C-scope 17 shown in Fig. 1A and the radar operator's C-scope 17a in Fig. 1 in accordance with the assumed azimuth.

The potentiometer 659 shown in Fig. 12 is connected to the Sanborn equipment through cable 677 and in response to the electrical value determined by potentiometer 659, the Sanborn equipment sends a signal to the radar equipment which governs the attenuation of the image on screens 17 and 17a in accordance with the assumed range.

The combination of echo simulator equipment Army Serial Number RC225-T3 and radar signal equipment Army Serial Number SCR720-A is known to the prior art, but in the prior art devices the potentiometers corresponding to the potentiometers 657, 659, 718 and 746 shown in Fig. 12 were manually set by an instructor according to the assumed factors of range, elevation angle and azimuth. My invention resides, therefore, in the disclosed improved means for introducing into the simulator equipment an electrical value corresponding to the assumed slant range, elevation angle and azimuth.

It should be noted that with my invention the pilot in the fighter 12 as well as the radar operator are provided the identical indicating and control equipment which they use in actual flight.

Other types of echo simulator equipment and real radar equipment may be used with my invention.

Slip stream simulation

It will be appreciated that the slip-stream of a plane in actual flight will cause a second plane in the slip-stream to rock as a result of the turbulence caused by the slip-stream. The following means are incorporated in this apparatus to cause the fighter 12 to respond in simulation of the way a real fighter would respond if it were in the slip-stream of a target plane.

Reference is made to Fig. 2 which shows the switch 800 affixed to the target recorder. When the bridge 463 is positioned to indicate a ground range of one mile or less, switch 800, also shown in Fig. 13, is closed.

Figure 13:
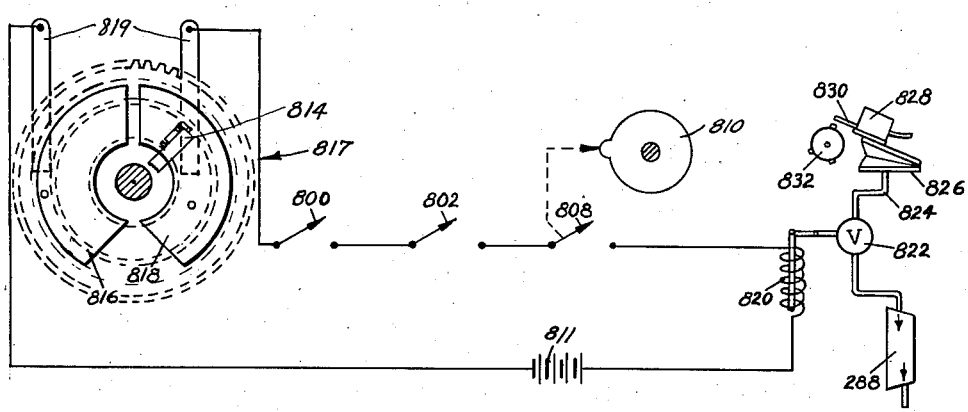
Fig. 13 is a schematic view of the slip-stream simulation control means.

Also shown in Fig. 2 is the switch 802 also shown in Fig. 13. This switch is closed whenever the disc 804 which indicates, in cooperation with pointer 806, an assumed altitude difference of between minus 500 and plus 500 feet. Also in Fig. 2 is a third switch 808 which is controlled by cam 810 which is rotated once for each change of 1000 feet in assumed altitude differential. Switch 808 is shown in Fig. 13, as is battery 811. Cam 810 is arranged relative to disc 804 so that both of the switches 802 and 808 are closed only when the assumed altitude differential is fifty feet or less.

Also seen in Fig. 2 is the gear 812 carrying the contact roller 814, gear 812 being rotatably mounted upon the lower end of sleeve 65. The gear 66 has on its lower side the two mutually insulated contact segments 816 and 818 seen in Fig. 13, and either or both of these segments may be contacted by roller 814. Upon the upper side of gear 66 are the two mutually insulated sliprings designated generally by 817, each of which is connected to one of the segments 816 and 818, and each of which is engaged by one of the brushes 819. This arrangement is shown diagrammatically in Fig. 13.

Inasmuch as sleeve 65 turns with changes in assumed target heading, and inasmuch as gear 812 rotates in response to changes in target compass bearing, it will be appreciated that roller 814 engages both of the segments 816 and 818 only when target compass bearing coincides with the assumed heading of the target plane. When this condition is met, as well as the factors of range and altitude, the fighter 12 is assumed to be in the slip-stream of the target plane.

Thus when roller 814 engages both of the segments 816 and 818 the solenoid 820 shown in Fig. 13 is energized opening the valve 822 connected to the source of vacuum 228. By means of connection 824 the bellows 826 is collapsed tilting the rough air control valve assembly 828 so that the fingers 830 are brought into operative position relative to cams 832 which are always rotating by means of a suitable source of power. The cams 832 operate the control mechanism 828 in the manner disclosed in U. S. Patent 2,099,857, and as disclosed in that patent, the operation of the rough air mechanism causes the fighter 12 to move in irregular combinations of pitch and bank. Thus, the rough air mechanism continues to run and cause the fighter 12 to pitch and bank whenever and as long as the outlined conditions of assumed ground range, altitude differential and target compass bearing prevail.

Summary

In the use of the apparatus of this invention before a practice interception of an assumed target, the recorders shown in Fig. 1 may be placed upon the chart 28 according to the assumed positions above the surface of the earth of the fighter and target. The fighter 12 may be turned to the initial assumed heading and it may be flown so that the fighter altitude indicator indicates the correct assumed altitude of the fighter. The instructor may also introduce the assumed altitude of the target. If the resultant assumed slant range, azimuth and target elevation angle are such that they are within the range of the indications given by the C-scopes 17 and 17a, range meter 19 and range scope 69I, the simulated target image will be properly positioned upon the screens and the simulated range will be given. If no indication is given the student in the fighter 12 must "fly" the fighter until an indication is received. From then on the changes in the positions of the recorders upon the chart, the heading of the fighter 12, the assumed altitude of the fighter 12, pitching and banking of the fighter 12, and changes in the assumed altitude of the target all affect the indications of assumed slant range, assumed elevation angle and assumed azimuth as shown to the student pilot in the fighter 12 as well as to the radar operator just as corresponding changes in the same factors in actual flight affect the indications of the radar equipment carried by the plane in actual flight. The student in the fighter 12 is able to "fly" the fighter in an attempt to intercept or elude the target as the case may be. The instructor can control the assumed speed of the target in any direction in a horizontal plane above the surface of the earth as well as the assumed rate of change of altitude of the target.

With the apparatus of this invention it therefore seems apparent that a student may be taught to navigate an airplane with respect to a target plane by means of radar indicating means.

However, the apparatus of my invention is not restricted to the use of teaching students to fly with respect to a moving target. It may be suitably adapted for the teaching of students to fly with respect to a navigational radar beacon, and many parts of my invention may be adapted for other uses.

Further, my invention may be readily modified to be used in conjunction with a grounded aviation trainer comprising a stationary fuselage rather than a universally mounted rotatable fuselage of the type disclosed herein. Electronic units may be substituted for some of the mechanical-electrical units disclosed in this invention.

It is therefore apparent that the apparatus of my invention is applicable to a wide variety of uses and that many changes may be made in the parts of the disclosed preferred embodiment without departing from the substance thereof. All such uses and changes are intended to be covered by the following claims.

I claim:

1. In a grounded navigation training system the combination of a support having a seat for a student, said support being mounted upon a stationary base; instrument indicating means positioned to be viewed by a student in said seat, said indicating means including means for indicating the assumed azimuth of an object from a plane in actual flight; means positioned near said seat simulating the banking control means of a real airplane; means for changing the indicated azimuth in response to changes in the assumed target compass bearing of an object from a plane in actual flight; and additional means for changing the indicated azimuth in response to an operation of said simulated banking control means.

2. In a grounded navigation training system the combination of a support having a seat for a student; instrument indicating means positioned to be viewed by a student in said seat, said indicating means including means for indicating the assumed azimuth of an object from a plane in actual flight; means positioned near said seat simulating the banking control means of a real airplane; a movable flight simulating device operatively connected to said support for indicating the assumed course of flight of said support; means interconnecting said flight simulating device and said azimuth indicating means for changing the indicated azimuth in response to movements of said flight simulating device; and additional means interconnecting said banking control simulating means and said azimuth indicating means for changing the indicated azimuth in response to an operation of said simulated banking control means.

3. In a grounded navigation training system the combination of a support having a seat for a student; instrument indicating means positioned to be viewed by a student in said seat, said indicating means including means for indicating the assumed azimuth of an object from a plane in actual flight; means positioned near said seat simulating the banking control means of a real airplane; a first member adapted to represent a navigational guide; a second movable flight simulating member operatively connected to said support for indicating the assumed path of flight of said support; means for changing the indicated azimuth in response to changes in the angular relationship between said first member and said second member; and additional means for changing the indicated azimuth in response to an operation of said simulated banking control means.

4. In a grounded navigation training system the combination of a support having a seat for a student; means positioned near said seat simulating the banking control means of a real airplane; a movable flight simulating device operatively connected to said support for indicating the assumed course of flight of said support; a movable element; means interconnecting said flight simulating device and said element for positioning said element according to the position of said flight simulating device; and means interconnecting said banking control means and said element for modifying the position of said element according to the movements of said simulated banking control means, and a unit connected to said movable element and responsive to the movements thereof.

5. In a grounded navigation training system the combination of a support having a seat for a student; means positioned near said seat simulating the banking control means of a real airplane; a first member adapted to represent the position of a navigational guide; a second movable course simulating member operatively connected to said support; coupling means movably responsive to the movements of said second member relative to said first member coupling said second and third members; a movable element; means for positioning said element in accordance with the position of said coupling means; and means interconnecting said banking control means and said element for modifying the position of said element by movements of said banking control means, and a unit connected to said movable element and responsive to the movements thereof.

6. In a grounded navigation training system the combination of a support having a seat for a student, said support being mounted upon a stationary base; instrument indicating means positioned to be viewed by a student in said seat, said indicating means including means for indicating the assumed azimuth of an object from a plane in actual flight; means positioned near said seat simulating the pitching control means of a real airplane; and means for changing the indicated azimuth in response to an operation of said simulated pitching control means.

7. In a grounded navigation training system the combination of a support having a seat for a student, said support being mounted upon a stationary base; instrument indicating means positioned to be viewed by a student in said seat, said indicating means including means for indicating the assumed azimuth of an object from a plane in actual flight; means positioned near said seat simulating the pitching control means of a real airplane; means for changing the indicated azimuth in response to changes in the assumed target compass bearing of an object from a plane in actual flight; and additional means for changing the indicated azimuth in response to an operation of said simulated pitching control means.

8. In a grounded navigation training system the combination of a support having a seat for a student; instrument indicating means positioned to be viewed by a student in said seat, said indicating means including means for indicating the assumed azimuth of an object from a plane in actual flight; means positioned near said seat simulating the pitching control means of a real airplane; a movable flight simulating device operatively connected to said support for indicating the assumed course of flight of said support; means interconnecting said flight simulating device and said azimuth indicating means for changing the indicated azimuth in response to movements of said flight simulating device; and additional means interconnecting said pitching control means and said azimuth indicating means for changing the indicated azimuth in response to an operation of said simulated pitching control means.

9. In a grounded navigation training system the combintaion of a support having a seat for a student; instrument indicating means positioned to be viewed by a student in said seat, said indicating means including means for indicating the assumed azimuth of an object from a plane in actual flight; means positioned near said seat simulating the pitching control means of a real airplane; a first member adapted to represent a navigational guide; a second movable flight simulating member operatively connected to said support for indicating the assumed path of flight of said support; means for changing the indicated azimuth in response to changes in the angular relationship between said first member and said second member; and additional means for changing the indicated azimuth in response to an operation of said simulated pitching control means.

10. In a grounded navigation training system the combination of a support having a seat for a student; means positioned near said seat simulating the pitching control means of a real airplane; a movable flight simulating device operatively connected to said support for indicating the assumed course of flight of said support; a movable element; means interconnecting said flight simulating device and said element for positioning said element according to the position of said flight simulating device; and means interconnecting said pitching control means and said element for modifying the position of said element according to the movements of said simulated pitching control means, and a unit connected to said movable element and responsive to the movements thereof.

11. In a grounded navigation training system the combination of a support having a seat for a student; means positioned near said seat simulating the pitching control means of a real airplane; a first member adapted to represent the position of a navigational guide; a second movable course simulating member operatively connected to said support; coupling means movably responsive to the movements of said second member relative to said first member coupling said second and third members; a movable element; means for positioning said element in accordance with the position of said coupling means; and means interconnecting said pitching control means and said element for modifying the position of said element by movements of said pitching control means, and a unit connected to said movable element and responsive to the movements thereof.

12. In a grounded navigation training system the combination of a seat for a student, said seat being mounted upon a stationary base; instrument indicating means positioned near said seat for indicating the assumed azimuth of an object relative to a plane in actual flight; operable means simulating the turning and pitching control means of a real airplane positioned near said seat; and means for changing the indication of said azimuth indicating means by an operation of said turning and pitching control means.

13. In a grounded navigation training system the combination of a seat for a student, said seat being mounted upon a stationary base; instrument indicating means positioned near said seat for indicating the assumed azimuth of an object relative to a plane in actual flight; operable means simulating the turning, pitching and banking control means of a real airplane positioned near said seat; and means for changing the indications of said azimuth indicating means by an operation of said turning, pitching and banking control means.

14. In a grounded navigation training system the combination of means representing an aircraft in the form of a support for a student, said support being universally mounted upon a stationary base for movement about the three axes of the support; means associated with said support and operable by a student in said support for selectively moving said support about any of its axes; means carried by the support for indicating to the student the assumed azimuth of an object relative to the aircraft represented by said support; and mechanical computing means operable by movements of said support for causing said indicating means to register in accordance with the instant position of said support about its three axes.

15. In a grounded navigation training system the combination of means representing an aircraft in the form of a support for a student, said support being universally mounted upon a stationary base for movement about the three axes of the support; means associated with said support and operable by a student in said support for selectively moving said support about any of its axes; a movable flight simulating device operatively connected to said support to be controlled by the movements of said support; means carried by the support for indicating to the stundent the assumed azimuth of an object relative to the aircraft represented by said support; and means interconnecting said flight simulating device and said azimuth indicating means as well as said support and said azimuth indicating means for causing said azimuth indicating means to register in accordance with the position of said flight simulating device and in accordance with the instant position of said support about at least two of its axes.

16. In a grounded navigation training system the combination of means representing an aircraft in the form of a support for a student, said support being universally mounted upon a stationary base for movement about the three axes of the support; means associated with said support and operable by a student in said support for selectively moving said support about any of its axes; a movable flight simulating device operatively connected to said support to be controlled by the movements of said support; means carried by the support for indicating to the student the assumed azimuth of an object relative to the aircraft represented by said support; and means interconnecting said flight simulating device and said azimuth indicating means as well as said support and said azimuth indicating means for causing said azimuth indicating means to register in accordance with the position of said flight simulating device and in accordance with the instant position of said support about its three axes.

17. A training device comprising in combination a grounded support mounted upon a stationary base and having a seat for a student; operable means associated with said support simulating the turning, pitching and banking control means of a real airplane; a target-image receiving device carried by said support including a screen positioned for viewing by a student; target-image positioning means in said target-image receiving device responsive to impulses received for moving a target-image in a direction to indicate a change in the assumed azimuth of a target from the support; impulse transmitting means connected to said target-image positioning means; and non-radiating computing means operated by the movements of said simulated turning, pitching and banking control means and connected to said impulse transmitting means for causing said impulse transmitting means to transmit impulses to said image positioning means in accordance with the movements of simulated turning, pitching and banking control means.

18. In a device of the character described the combination of a first airplane simulating member comprising a support for a student; means associated with said support simulating the turning, banking and pitching control means in a real airplane; a second airplane simulating member mounted upon a universal joint for movement about its three axes; and means connecting said second airplane simulating member to said simulated control means for selectively moving said second airplane simulating member about one of its axes in response to a movement of each of said simulated control means; indicating means carried by said first airplane simulating member; and means interconnecting said second airplane simulating member and said indicating means for causing said indicating means to register in accordance with the movements of said second airplane simulating member.

19. In a device of the character described the combination of a first airplane simulating member comprising a support for a student; means associated with said support simulating the turning, banking and pitching control means in a real airplane; a movable flight simulating member connected to said support to be controlled thereby; a second airplane simulating member universally mounted for movement about its three axes; means connecting said second airplane simulating member to said simulated control means for selectively moving said second airplane simulating member about a different one of its axes in response to a movement of each of said simulated control means; and means interconnecting said flight simulating device and said second airplane simulating member for moving said second airplane simulating member about one of its axes in response to the movements of said flight simulating member.

20. In a grounded aircraft training system the combination of a first airplane simulating member comprising a support for a student; means associated with said support simulating the turning, banking and pitching control means in a real airplane; a movable flight simulating member connected to said support to be controlled thereby; a member adapted to represent a navigational guide; movable coupling means responsive to the movements of said flight simulating member relative to said navigational guide representing member coupling said flight simulating member to said navigational guide representing member; a second airplane simulating member arranged for movement about its three axes; means connecting said second airplane simulating member with said simulated control means for selectively moving said second airplane simulating member about one of its axes in response to a movement of each of said simulated control means; and means connecting said second airplane simulating member with said coupling means for moving said airplane simulating member about one of its axes in response to a movement of said coupling means.

21. A unit of the type described comprising a first member mounted for movement about any of its three axes for establishing a movable reference plane; a second member mounted for movement relative to said first member for establishing a line intersecting the reference plane established by said first member; means connected to said first member and operable under predetermined conditions for moving said first member about any of its three axes; and means responsive to relative movements between said two members for measuring the angle between said line and the projection of the line upon the plane established by the first member.

22. A unit of the type described comprising a first member mounted for movement about any of its three axes for establishing a movable reference plane; a second member mounted for movement relative to said first member for establishing a line intersecting the reference plane established by said first member; means connected to said first member and operable under predetermined conditions for moving said first member about any of its three axes; and means responsive to relative movements between said two members for measuring the angle between the projection of the line upon the reference plane and one of the axes of said reference plane establishing member.

23. A unit of the type described comprising a first member mounted for movement about any of its three axes for establishing a movable reference plane; a second member mounted for movement relative to said first member for establishing a line intersecting the reference plane established by said first member; means connected to said first member and operable under predetermined conditions for moving said first member about any of its three axes; means responsive to relative movements between said two members for measuring the angle between said line and the projection of the line upon the plane established by the first member; and additional means responsive to relative movements between said two members for measuring the angle between the projection of the line upon the reference plane and one of the axes of the reference plane establishing member.

24. A unit of the type described comprising a first member mounted for movement about any of its axes for establishing a movable reference plane; a second member mounted for movement relative to said first member for establishing a line intersecting the reference plane at the point of intersection of the three axes of the first member; means connected to said first member and operable under predetermined conditions for moving said first member about any of its three axes; and means responsive to relative movements between said two members for measuring the angle between said line and the projection of the line upon the plane established by the first member.

25. A unit of the type described comprising a first member mounted for movement about any of its axes for establishing a movable reference plane; a second member mounted for movement relative to said first member for establishing a line intersecting the reference plane at the point of intersection of the three axes of the first member; means connected to said first member and operable under predetermined conditions for moving said first member about any of its three axes; and means responsive to relative movements between said two members for measuring the angle between the projection of the line upon the reference plane and one of the axes of said reference plane establishing member.

26. A unit of the type described comprising a first member mounted for movement about any of its three axes for establishing a movable reference plane; a second member mounted for movement relative to said first member for establishing a line intersecting the reference plane at the point of intersection of the three axes of the first member; means connected to said first member and operable under predetermined conditions for moving said first member about any of its three axes; means responsive to relative movements between said two members for measuring the angle between said line and the projection of the line upon the plane established by the first member; and additional means responsive to relative movements between said two members for measuring the angle between the projection of the line upon the reference plane and one of the axes of the reference plane establishing member.

27. A unit of the type described comprising a first member mounted for movement about any of its three axes for establishing a movable reference plane; a second member mounted for movement relative to said first member for establishing a line intersecting the reference plane established by said first member; means connected to said first member and operable under predetermined conditions for moving said first member about any of its three axes; means connected to said second member and operable under predetermined conditions for moving said second member to move said line relative to the reference plane; and means responsive to relative movements between said two members for measuring the angle between said line and the projection of the line upon the reference plane established by the first member.

28. A unit of the type described comprising a first member mounted for movement about any of its three axes for establishing a movable reference plane; a second member mounted for movement relative to said first member for establishing a line intersecting the reference plane established by said first member; means connected to said first member and operable under predetermined conditions for moving said first member about any of its three axes; means connected to said second member and operable under predetermined conditions for moving said second member to move said line relative to the reference plane; and means responsive to relative movements between said two members for measuring the angle between the projection of the line upon the reference plane and one of the axes of the reference plane establishing member.

29. A unit of the type described comprising a first member mounted for movement about any of its three axes for establishing a movable reference plane; a second member mounted for movement relative to said first member for establishing a line intersecting the reference plane established by said first member; means connected to said first member and operable under predetermined conditions for moving said first member about any of its three axes; means connected to said second member and operable under predetermined conditions for moving said second member to move said line relative to the reference plane; means responsive to relative movements between said two members for measuring the angle between said line and the projection of the line upon the reference plane established by the first member; and additional means responsive to relative movements between said two members for measuring the angle between the said projection and one of the axes of said first member.

30. A unit of the type described comprising a first member mounted for movement about any of its three axes for establishing a movable reference plane; a second member mounted for movement relative to said first member for establishing a line intersecting the reference plane at a point of intersection of the three axes of said first member; means connected to said first member and operable under predetermined conditions for moving said first member about any of its three axes; means connected to said second member and operable under predetermined conditions for moving said second member to move said line relative to the reference plane; and means responsive to relative movements between said two members for measuring the angle between said line and the projection of the line upon the reference plane established by the first member.

31. A unit of the type described comprising a first member mounted for movement about any of its three axes for establishing a reference plane; a second member mounted for movement relative to said first member for establishing a line intersecting the reference plane at the point of intersection of the three axes of said first member; means connected to said first member and operable under predetermined conditions for moving said first member about any of its three axes; means connected to said second member and operable under predetermined conditions for moving said second member to move said line relative to the reference plane; and means responsive to relative movements between said two members for measuring the angle between the projection of the line upon the reference plane and one of the axes of the reference plane establishing member.

32. A unit of the type described comprising a first member mounted for movement about any of its three axes for establishing a movable reference plane; a second member mounted for movement relative to said first member for establishing a line intersecting the reference plane at the point of intersection of the three axes of said first member; means connected to said first member and operable under predetermined conditions for moving said first member about any of its three axes; means connected to said second member and operable under predetermined conditions for moving said second member to move said line relative to the reference plane; means responsive to relative movements between said two members for measuring the angle between said line and the projection of the line upon the reference plane established by the first member; and additional means responsive to relative movements between said two members for measuring the angle between the said projection and one of the axes of said first member.

33. In a grounded navigation training system the combination of a first airplane simulating member in the form of a support for a student universally mounted for turning, pitching and banking with respect to a stationary base; a second airplane simulating member universally mounted for movement about any one of its three axes; and means connecting said support to said second airplane simulating member for moving said member about one of its axes with a turning of said support, about the second of its axes with a pitching of said support, and about its third axis with a banking of said support.

34. In a grounded navigation training system the combination of a support for a student; means associated with said support simulating the turning, pitching and banking control means in a real airplane; a first member connected to said simulated control means, said member being mounted for movement about any of its three axes for establishing a movable reference plane; means connected to said member and operable under predetermined conditions for selectively moving said member about its axes in response to a movement of each of said simulated control means; a second member mounted for movement relative to said first member for establishing a line intersecting said reference plane at the point of intersection of the axes of the reference plane forming member; and means responsive to relative movements between said two members for measuring the angle between said line and the projection of the line upon the plane established by said member.

35. In a grounded navigation training system the combination of a support for a student; means associated with said support simulating the turning, pitching and banking control means in a real airplane; a first member connected to said simulated control means, said member being mounted for movement about any of its three axes for establishing a movable reference plane; means connected to said member and operable under predetermined conditions for selectively moving said member about its axes in response to a movement of each of said simulated control means; a second member mounted for movement relative to said first member for establishing a line intersecting said reference plane at the point of intersection of the axes of the reference plane forming member; and means responsive to relative movements between said two members for measuring the angle between the projection of said line upon said reference plane and one of the axes of said reference plane establishing member.

RAYMOND E. KITTREDGE.

REFERENCES CITED

The following references are of record in the file of this patent:

UNITED STATES PATENTS

| Number | Name | Date |
| --- | --- | --- |
| 1,393,456 | Ruggles | Oct. 11, 1921 |
| 1,825,462 | Link | Sept. 29, 1931 |
| 1,973,592 | Weisinger | Sept. 11, 1934 |
| 2,099,857 | Link | Nov. 23, 1937 |
| 2,179,663 | Link | Nov. 14, 1939 |
| 2,321,799 | Cone | June 15, 1943 |
| 2,373,313 | Jeandron | Apr. 10, 1945 |